US012297076B2

(12) United States Patent
Collins et al.

(10) Patent No.: US 12,297,076 B2
(45) Date of Patent: May 13, 2025

(54) MODULAR STAIRWELL AND ELEVATOR SHAFT SYSTEM AND METHOD

(71) Applicant: Innovative Building Technologies, LLC, Seattle, WA (US)

(72) Inventors: Arlan Collins, Seattle, WA (US); Mark Woerman, Seattle, WA (US); Peter Damento, Seattle, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 673 days.

(21) Appl. No.: 17/292,640

(22) PCT Filed: May 8, 2019

(86) PCT No.: PCT/US2019/031370
§ 371 (c)(1),
(2) Date: May 10, 2021

(87) PCT Pub. No.: WO2020/101735
PCT Pub. Date: May 22, 2020

(65) Prior Publication Data

US 2021/0395042 A1 Dec. 23, 2021

Related U.S. Application Data

(60) Provisional application No. 62/767,339, filed on Nov. 14, 2018.

(51) Int. Cl.
*B66B 11/00* (2006.01)
*B66B 7/02* (2006.01)
(Continued)

(52) U.S. Cl.
CPC .......... *B66B 11/0005* (2013.01); *B66B 7/023* (2013.01); *B66B 19/00* (2013.01);
(Continued)

(58) Field of Classification Search
CPC ...... E04H 12/342; E04F 11/02; E04F 11/035; E04B 1/348; E04B 1/34861; E04B 1/34823; E04B 1/3483; E04B 1/24; B66B 11/0005
See application file for complete search history.

(56) References Cited

U.S. PATENT DOCUMENTS 1,168,556 A 1/1916 Robinson et al.
1,501,288 A 7/1924 Morley
(Continued)

FOREIGN PATENT DOCUMENTS

AU 2005200682 5/2005
AU 2012211472 2/2014
(Continued)

OTHER PUBLICATIONS

US 8,701,371 B2, 04/2014, Collins et al. (withdrawn)
(Continued)

*Primary Examiner* — Jessica L Laux
(74) *Attorney, Agent, or Firm* — IP Spring

(57) ABSTRACT

A prefabricated modular stairwell and elevator shaft system is described. The system can include an end panel, a first side panel, a second elevator shaft panel, a second side panel, and a first elevator shaft panel. The prefabricated modular stairwell and elevator shaft system can also include stairwell components (including one or more treads, one or more landings, and one or more handrails), one or more counterweight rails, one or more counterweight brackets, a stairwell door, and a stairwell door frame.

14 Claims, 17 Drawing Sheets

100

(51) Int. Cl.

| | |
|---|---|
| ***B66B 19/00*** | (2006.01) |
| ***E04B 1/24*** | (2006.01) |
| ***E04F 11/02*** | (2006.01) |
| ***E04F 11/18*** | (2006.01) |

(52) U.S. Cl.

CPC .............. *B66B 19/002* (2013.01); *E04B 1/24* (2013.01); *E04F 11/02* (2013.01); *E04F 11/18* (2013.01)

(56) References Cited

U.S. PATENT DOCUMENTS 1,876,528 A 7/1931 Walters
1,883,376 A 10/1932 George et al.
2,160,161 A 5/1939 Marsh
2,270,268 A 1/1942 Chambers
2,419,319 A 4/1947 Lankton
2,495,862 A 1/1950 Osborn
2,562,050 A 7/1951 Lankton
2,686,420 A 8/1954 Youtz
2,722,724 A 11/1955 Walter
2,758,467 A 8/1956 Brown et al.
2,871,544 A 2/1959 Youtz
2,871,997 A 2/1959 Simpson et al.
2,877,990 A 3/1959 Goemann
2,946,413 A 7/1960 Weismann
3,017,723 A 1/1962 Von Heidenstam
3,030,670 A 4/1962 Bigelow
3,052,449 A 9/1962 Long et al.
3,053,015 A 9/1962 George
3,053,509 A 9/1962 Haupt et al.
3,065,575 A 11/1962 Ray
3,079,652 A 3/1963 Wahlfeld
3,090,164 A 5/1963 Nels
3,184,893 A 5/1965 Booth
3,221,454 A 12/1965 Giulio
3,235,917 A 2/1966 Skubic
3,236,014 A 2/1966 Edgar
3,245,183 A 4/1966 Tessin
3,281,172 A 10/1966 Kuehl
3,315,424 A 4/1967 Smith
3,324,615 A 6/1967 Zinn
3,324,617 A 6/1967 Knight et al.
3,355,853 A 12/1967 Wallace
3,376,919 A 4/1968 Agostino
3,388,512 A 6/1968 Newman
3,392,497 A 7/1968 Vantine
3,411,252 A 11/1968 Boyle, Jr.
3,460,302 A 8/1969 Cooper
3,469,873 A 9/1969 Glaros
3,490,191 A 1/1970 Ekblom
3,533,205 A 10/1970 Pestel et al.
3,568,380 A 3/1971 Stucky et al.
3,579,935 A 5/1971 Regan et al.
3,590,393 A 7/1971 Hollander
3,594,965 A 7/1971 Saether
3,601,937 A 8/1971 Campbell
3,604,174 A 9/1971 Nelson. , Jr.
3,608,258 A 9/1971 Spratt
3,614,803 A 10/1971 Matthews
3,638,380 A 2/1972 Perri
3,707,165 A 12/1972 Stahl
3,713,265 A 1/1973 Wysocki et al.
3,721,056 A 3/1973 Toan
3,722,169 A 3/1973 Boehmig
3,727,753 A 4/1973 Starr
3,742,666 A 7/1973 Antoniou
3,750,366 A 8/1973 Rich, Jr. et al.
3,751,864 A 8/1973 Berger et al.
3,755,974 A 9/1973 Berman
3,762,115 A 10/1973 McCaul, III
3,766,574 A 10/1973 Smid, Jr.
3,782,057 A 1/1974 Gross
3,818,660 A 6/1974 Dillon
3,821,818 A 7/1974 Alosi
3,823,520 A 7/1974 Ohta et al.
3,845,601 A 11/1974 Kostecky
3,853,452 A 12/1974 Delmonte
3,885,367 A 5/1975 Thunberg
3,898,782 A 8/1975 Donato
3,906,686 A 9/1975 Dillon
3,921,362 A 11/1975 Ortega
3,925,948 A 12/1975 Sauer et al.
3,926,486 A 12/1975 Sasnett
3,971,605 A 7/1976 Sasnett
3,974,607 A 8/1976 Balinski
3,974,618 A 8/1976 Cortina
3,990,202 A 11/1976 Becker
4,018,020 A 4/1977 Sauer et al.
4,038,796 A 8/1977 Eckel
4,050,215 A 9/1977 Fisher
4,059,936 A 11/1977 Lukens
4,065,905 A 1/1978 Lely et al.
4,078,345 A 3/1978 Piazzalunga
4,107,886 A 8/1978 Ray
4,112,173 A 9/1978 Roudebush
4,114,335 A 9/1978 Carroll
4,142,255 A 3/1979 Togni
4,161,087 A 7/1979 Levesque
4,170,858 A 10/1979 Walker
4,171,545 A 10/1979 Kann
4,176,504 A 12/1979 Huggins
4,178,343 A 12/1979 Rojo, Jr.
4,205,719 A 6/1980 Norell et al.
4,206,162 A 6/1980 Vanderklaauw
4,214,413 A 7/1980 Los
4,221,441 A 9/1980 Bain
4,226,061 A 10/1980 Day, Jr.
4,227,360 A 10/1980 Balinski
4,248,020 A 2/1981 Zielinski et al.
4,251,974 A 2/1981 Vanderklaauw
4,280,307 A 7/1981 Griffin
4,314,430 A 2/1982 Farrington
4,325,205 A 4/1982 Salim
4,327,529 A 5/1982 Bigelow, Jr
4,341,052 A 7/1982 Douglass, Jr.
4,361,994 A 12/1982 Carver
4,389,831 A 6/1983 Baumann
4,397,127 A 8/1983 Mieyal
4,435,927 A 3/1984 Umezu
4,441,286 A 4/1984 Skvaril
4,447,987 A 5/1984 Lesosky
4,447,996 A 5/1984 Maurer, Jr.
4,477,934 A 10/1984 Salminen
4,507,901 A 4/1985 Carroll
4,513,545 A 4/1985 Hopkins, Jr.
4,528,793 A 7/1985 Johnson
4,531,336 A 7/1985 Gartner
4,548,003 A 10/1985 Johansson et al.
4,592,175 A 6/1986 Werner
4,645,037 A * 2/1987 Gomez ................. E04F 17/005
52/185
4,646,495 A 3/1987 Chalik
4,648,228 A 3/1987 Kiselewski
4,655,011 A 4/1987 Borges
4,688,750 A 8/1987 Teague et al.
4,712,352 A 12/1987 Low
4,757,663 A 7/1988 Kuhr
4,813,193 A 3/1989 Altizer
4,856,244 A 8/1989 Clapp
4,862,663 A 9/1989 Krieger
4,893,435 A 1/1990 Shalit
4,910,932 A 3/1990 Honigman
4,918,897 A 4/1990 Luedtke
4,919,164 A 4/1990 Barenburg
4,974,366 A 12/1990 Tizzoni
4,991,368 A 2/1991 Amstutz
5,009,043 A 4/1991 Kurrasch
5,010,690 A 4/1991 Geoffrey
5,036,638 A 8/1991 Kurtz, Jr.
5,076,310 A 12/1991 Barenburg
5,079,890 A 1/1992 Kubik et al.
5,113,631 A 5/1992 Digirolamo et al.
5,127,203 A 7/1992 Paquette

(56) References Cited

U.S. PATENT DOCUMENTS

| | | | |
|---|---|---|---|
| 5,127,760 | A | 7/1992 | Brady |
| 5,154,029 | A | 10/1992 | Sturgeon |
| 5,185,971 | A | 2/1993 | Johnson, Jr. |
| 5,205,091 | A | 4/1993 | Brown |
| 5,212,921 | A | 5/1993 | Unruh |
| 5,228,254 | A | 7/1993 | Honeycutt, Jr. |
| 5,233,810 | A | 8/1993 | Jennings |
| 5,254,203 | A | 10/1993 | Corston |
| 5,307,600 | A | 5/1994 | Simon, Jr. |
| 5,359,816 | A | 11/1994 | Iacouides |
| 5,359,820 | A | 11/1994 | Mckay |
| 5,361,556 | A | 11/1994 | Menchetti |
| 5,402,608 | A | 4/1995 | Chu |
| 5,402,612 | A | 4/1995 | diGirolamo et al. |
| 5,412,913 | A | 5/1995 | Daniels et al. |
| 5,426,894 | A | 6/1995 | Headrick |
| 5,452,552 | A | 9/1995 | Ting |
| 5,459,966 | A | 10/1995 | Suarez |
| 5,471,804 | A | 12/1995 | Winter, IV |
| 5,483,773 | A | 1/1996 | Parisien |
| 5,493,838 | A | 2/1996 | Ross |
| 5,509,242 | A | 4/1996 | Rechsteiner et al. |
| 5,519,971 | A | 5/1996 | Ramirez |
| 5,528,866 | A * | 6/1996 | Yulkowski ............ E04B 1/3483 52/79.12 |
| 5,528,877 | A | 6/1996 | Franklin |
| 5,531,539 | A | 7/1996 | Crawford |
| 5,584,142 | A | 12/1996 | Spiess |
| 5,592,796 | A | 1/1997 | Landers |
| 5,593,115 | A | 1/1997 | Lewis |
| 5,611,173 | A | 3/1997 | Headrick et al. |
| 5,611,185 | A | 3/1997 | Wilz |
| 5,628,158 | A | 5/1997 | Porter |
| 5,640,824 | A | 6/1997 | Johnson |
| 5,644,871 | A | 7/1997 | Cohen et al. |
| 5,660,017 | A | 8/1997 | Houghton |
| 5,678,384 | A | 10/1997 | Maze |
| 5,697,189 | A | 12/1997 | Miller |
| 5,699,643 | A | 12/1997 | Kinard |
| 5,706,607 | A | 1/1998 | Frey |
| 5,715,642 | A | 2/1998 | Buers |
| 5,724,773 | A | 3/1998 | Hall |
| 5,735,100 | A | 4/1998 | Campbell |
| 5,743,330 | A | 4/1998 | Bilotta et al. |
| 5,746,034 | A | 5/1998 | Luchetti et al. |
| 5,755,982 | A | 5/1998 | Strickland |
| 5,850,686 | A | 12/1998 | Mertes |
| 5,867,964 | A | 2/1999 | Perrin |
| 5,870,867 | A | 2/1999 | Mitchell |
| 5,906,080 | A | 5/1999 | Digirolamo et al. |
| 5,921,041 | A | 7/1999 | Egri, II |
| 5,921,046 | A | 7/1999 | Hammond, Jr. |
| 5,970,680 | A | 10/1999 | Powers |
| 5,987,841 | A | 11/1999 | Campo |
| 5,992,109 | A | 11/1999 | Jonker |
| 5,997,792 | A | 12/1999 | Gordon |
| 6,000,194 | A | 12/1999 | Nakamura |
| 6,055,787 | A | 5/2000 | Gerhaher et al. |
| 6,065,852 | A | 5/2000 | Crumley |
| 6,073,401 | A | 6/2000 | Iri et al. |
| 6,073,413 | A | 6/2000 | Tongiatama |
| 6,076,319 | A | 6/2000 | Hendershot |
| 6,086,350 | A | 7/2000 | Del Monte |
| 6,128,877 | A | 10/2000 | Goodman et al. |
| 6,151,851 | A | 11/2000 | Carter |
| 6,154,774 | A | 11/2000 | Furlong |
| 6,170,214 | B1 | 1/2001 | Treister et al. |
| 6,199,336 | B1 | 3/2001 | Poliquin |
| 6,205,733 | B1 | 3/2001 | Lalonde |
| 6,240,704 | B1 | 6/2001 | Porter |
| 6,243,993 | B1 | 6/2001 | Swensson |
| 6,244,002 | B1 | 6/2001 | Martin |
| 6,244,008 | B1 | 6/2001 | Miller |
| 6,260,329 | B1 | 7/2001 | Mills |
| 6,269,600 | B1 | 8/2001 | Tambakakis |
| 6,289,646 | B1 | 9/2001 | Watanabe |
| 6,301,838 | B1 | 10/2001 | Hall |
| 6,308,465 | B1 | 10/2001 | Galloway et al. |
| 6,308,491 | B1 | 10/2001 | Porter |
| 6,340,508 | B1 | 1/2002 | Frommelt |
| 6,371,188 | B1 | 4/2002 | Baczuk |
| 6,393,774 | B1 | 5/2002 | Fisher |
| 6,421,968 | B2 | 7/2002 | Degelsegger |
| 6,427,407 | B1 | 8/2002 | Wilson |
| 6,430,883 | B1 | 8/2002 | Paz et al. |
| 6,446,396 | B1 | 9/2002 | Marangoni et al. |
| 6,460,297 | B1 | 10/2002 | Bonds et al. |
| 6,481,172 | B1 | 11/2002 | Porter |
| 6,484,460 | B2 | 11/2002 | VanHaitsma |
| 6,571,523 | B2 | 6/2003 | Chambers |
| 6,625,937 | B1 | 9/2003 | Parker |
| 6,651,393 | B2 | 11/2003 | Don |
| 6,688,056 | B2 | 2/2004 | Von Hoyningen Huene et al. |
| 6,729,094 | B1 | 5/2004 | Spencer et al. |
| 6,748,709 | B1 | 6/2004 | Sherman et al. |
| 6,807,790 | B2 | 10/2004 | Strickland |
| 6,837,013 | B2 | 1/2005 | Foderberg et al. |
| 6,922,960 | B2 | 8/2005 | Sataka |
| 6,935,079 | B1 | 8/2005 | Julian et al. |
| 6,964,410 | B1 | 11/2005 | Hansen |
| 7,007,343 | B2 | 3/2006 | Weiland |
| 7,059,017 | B1 | 6/2006 | Rosko |
| 7,143,555 | B2 | 12/2006 | Miller |
| RE39,462 | E | 1/2007 | Brady |
| 7,389,620 | B1 | 6/2008 | McManus |
| 7,395,999 | B2 | 7/2008 | Walpole |
| 7,444,793 | B2 | 11/2008 | Raftery et al. |
| 7,467,469 | B2 | 12/2008 | Wall |
| 7,484,329 | B2 | 2/2009 | Fiehler |
| 7,484,339 | B2 | 2/2009 | Fiehler |
| 7,493,729 | B1 | 2/2009 | Semmes |
| 7,497,057 | B1 | 3/2009 | Hansen et al. |
| 7,546,715 | B2 | 6/2009 | Roen |
| 7,574,837 | B2 | 8/2009 | Hagen, Jr. et al. |
| 7,640,702 | B2 | 1/2010 | Termohlen |
| 7,658,045 | B2 | 2/2010 | Elliott et al. |
| 7,676,998 | B2 | 3/2010 | Lessard |
| 7,694,462 | B2 | 4/2010 | O'Callaghan |
| 7,721,491 | B2 | 5/2010 | Appel |
| 7,748,193 | B2 | 7/2010 | Knigge |
| 7,866,636 | B1 | 1/2011 | Hansen |
| 7,908,810 | B2 | 3/2011 | Payne, Jr. et al. |
| 7,921,965 | B1 | 4/2011 | Surace |
| 7,941,985 | B2 | 5/2011 | Simmons |
| 7,947,614 | B2 | 5/2011 | Hanna |
| 7,966,778 | B2 | 6/2011 | Klein |
| 8,051,623 | B2 | 11/2011 | Loyd |
| D652,956 | S | 1/2012 | Tanaka et al. |
| 8,096,084 | B2 | 1/2012 | Studebaker et al. |
| 8,109,058 | B2 | 2/2012 | Miller |
| 8,127,507 | B1 | 3/2012 | Bilge |
| 8,166,716 | B2 | 5/2012 | Macdonald et al. |
| 8,234,827 | B1 | 8/2012 | Schroeder, Sr. |
| 8,234,833 | B2 | 8/2012 | Miller |
| 8,251,175 | B1 | 8/2012 | Englert et al. |
| 8,276,328 | B2 | 10/2012 | Pépin |
| 8,322,086 | B2 | 12/2012 | Weber |
| 8,359,808 | B2 | 1/2013 | Stephens, Jr. |
| 8,424,251 | B1 | 4/2013 | Tinianov |
| 8,490,349 | B2 | 7/2013 | Lutzner |
| 8,505,259 | B1 | 8/2013 | Degtyarev |
| 8,539,732 | B2 | 9/2013 | Leahy |
| 8,555,581 | B2 | 10/2013 | Amend |
| 8,555,589 | B2 | 10/2013 | Semmens et al. |
| 8,555,598 | B2 | 10/2013 | Wagner et al. |
| 8,621,806 | B2 | 1/2014 | Studebaker et al. |
| 8,621,818 | B1 | 1/2014 | Glenn |
| 8,631,616 | B2 | 1/2014 | Carrion et al. |
| 8,667,755 | B1 | 3/2014 | Finfrock et al. |
| 8,733,046 | B2 | 5/2014 | Naidoo |
| 8,769,891 | B2 | 7/2014 | Kelly |
| 8,826,613 | B1 | 9/2014 | Chrien |
| 8,833,025 | B2 | 9/2014 | Krause |
| 8,950,132 | B2 | 2/2015 | Collins et al. |

(56) References Cited

U.S. PATENT DOCUMENTS

| | | | |
|---|---|---|---|
| 8,966,845 | B1 | 3/2015 | Ciuperca |
| 8,978,324 | B2 | 3/2015 | Collins et al. |
| 8,991,111 | B1 | 3/2015 | Harkins |
| 8,997,424 | B1 | 4/2015 | Miller |
| 9,027,307 | B2 | 5/2015 | Collins et al. |
| 9,382,709 | B2 | 7/2016 | Collins et al. |
| 9,422,713 | B2 | 8/2016 | Trebil |
| 9,637,911 | B2 | 5/2017 | Doupe et al. |
| 9,683,361 | B2 | 6/2017 | Timberlake et al. |
| 9,719,247 | B2 | 8/2017 | Tauferner |
| 9,863,137 | B2 | 1/2018 | Knoblauch et al. |
| 10,041,289 | B2 | 8/2018 | Collins et al. |
| 10,260,250 | B2 | 4/2019 | Collins et al. |
| 10,273,686 | B2 | 4/2019 | Lake |
| 10,323,428 | B2 | 6/2019 | Collins et al. |
| 10,370,851 | B2 | 8/2019 | Bodwell et al. |
| 10,422,131 | B2 | 9/2019 | Imbeau et al. |
| 10,501,929 | B2 | 12/2019 | Henry |
| 10,508,442 | B2 | 12/2019 | Collins et al. |
| 10,676,923 | B2 | 6/2020 | Collins et al. |
| 10,731,330 | B2 | 8/2020 | Petricca |
| 11,054,148 | B2 | 7/2021 | Collins et al. |
| 11,054,322 | B2 | 7/2021 | Steiner |
| 11,199,019 | B1 | 12/2021 | Ramadan et al. |
| 2002/0059763 | A1 | 5/2002 | Wong |
| 2002/0092703 | A1 | 7/2002 | Gelin et al. |
| 2002/0134036 | A1 | 9/2002 | Daudet et al. |
| 2002/0152704 | A1 | 10/2002 | Thompson et al. |
| 2002/0152713 | A1 | 10/2002 | Greco |
| 2002/0170243 | A1 | 11/2002 | Don |
| 2002/0184836 | A1 | 12/2002 | Takeuchi et al. |
| 2003/0005653 | A1 | 1/2003 | Sataka |
| 2003/0056445 | A1 | 3/2003 | Cox |
| 2003/0056452 | A1 | 3/2003 | Plsek et al. |
| 2003/0084629 | A1 | 5/2003 | Strickland et al. |
| 2003/0101680 | A1 | 6/2003 | Lee |
| 2003/0140571 | A1 | 7/2003 | Muha et al. |
| 2003/0167712 | A1 | 9/2003 | Robertson |
| 2003/0167719 | A1 | 9/2003 | Alderman |
| 2003/0200706 | A1 | 10/2003 | Kahan et al. |
| 2003/0221381 | A1 | 12/2003 | Ting |
| 2004/0003565 | A1 | 1/2004 | Konopka |
| 2004/0065036 | A1 | 4/2004 | Capozzo |
| 2004/0103596 | A1 | 6/2004 | Don |
| 2004/0221518 | A1 | 11/2004 | Westra |
| 2005/0081484 | A1 | 4/2005 | Yland |
| 2005/0108957 | A1 | 5/2005 | Quesada |
| 2005/0188626 | A1 | 9/2005 | Johnson |
| 2005/0188632 | A1 | 9/2005 | Rosen |
| 2005/0198919 | A1 | 9/2005 | Hester, Jr. |
| 2005/0204697 | A1 | 9/2005 | Rue |
| 2005/0204699 | A1 | 9/2005 | Rue |
| 2005/0210764 | A1 | 9/2005 | Foucher et al. |
| 2005/0210798 | A1 | 9/2005 | Burg et al. |
| 2005/0235571 | A1 | 10/2005 | Ewing et al. |
| 2005/0235581 | A1 | 10/2005 | Cohen |
| 2005/0247013 | A1 | 11/2005 | Walpole |
| 2005/0257476 | A1 | 11/2005 | Saidoo et al. |
| 2005/0262771 | A1 | 12/2005 | Gorman |
| 2006/0021289 | A1 | 2/2006 | Elmer |
| 2006/0070319 | A1 | 4/2006 | Flynn |
| 2006/0070321 | A1 | 4/2006 | Au |
| 2006/0090326 | A1 | 5/2006 | Corbett |
| 2006/0096202 | A1 | 5/2006 | Delzotto |
| 2006/0117689 | A1 | 6/2006 | Onken et al. |
| 2006/0137293 | A1 | 6/2006 | Klein |
| 2006/0143856 | A1 | 7/2006 | Rosko et al. |
| 2006/0150521 | A1 | 7/2006 | Henry |
| 2006/0179764 | A1 | 8/2006 | Ito |
| 2006/0236628 | A1 | 10/2006 | Siu |
| 2006/0248825 | A1 | 11/2006 | Garringer |
| 2006/0277841 | A1 | 12/2006 | Majusiak |
| 2006/0283132 | A1 | 12/2006 | Bankston et al. |
| 2007/0000198 | A1 | 1/2007 | Payne |
| 2007/0015424 | A1 | 1/2007 | Toas et al. |
| 2007/0074464 | A1 | 4/2007 | Eldridge |
| 2007/0107349 | A1 | 5/2007 | Erker |
| 2007/0151196 | A1 | 7/2007 | Boatwright |
| 2007/0157539 | A1 | 7/2007 | Knigge et al. |
| 2007/0163197 | A1 | 7/2007 | Payne et al. |
| 2007/0209306 | A1 | 9/2007 | Andrews et al. |
| 2007/0234657 | A1 | 10/2007 | Speyer et al. |
| 2007/0251168 | A1 | 11/2007 | Turner |
| 2007/0283640 | A1 | 12/2007 | Shivak et al. |
| 2007/0294954 | A1 | 12/2007 | Barrett |
| 2008/0000177 | A1 | 1/2008 | Siu |
| 2008/0017725 | A1 | 1/2008 | Backman |
| 2008/0057290 | A1 | 3/2008 | Guevara et al. |
| 2008/0092472 | A1 | 4/2008 | Doerr et al. |
| 2008/0098676 | A1 | 5/2008 | Hutchens |
| 2008/0099283 | A1 | 5/2008 | Reigwein |
| 2008/0104901 | A1 | 5/2008 | Olvera |
| 2008/0155927 | A1 | 7/2008 | Wendt et al. |
| 2008/0168741 | A1 | 7/2008 | Gilgan |
| 2008/0178542 | A1 | 7/2008 | Williams |
| 2008/0178642 | A1 | 7/2008 | Sanders |
| 2008/0190053 | A1 | 8/2008 | Surowiecki |
| 2008/0202048 | A1 | 8/2008 | Miller et al. |
| 2008/0222981 | A1 | 9/2008 | Gobbi |
| 2008/0229669 | A1 | 9/2008 | Abdollahzadeh et al. |
| 2008/0245007 | A1 | 10/2008 | McDonald |
| 2008/0279620 | A1 | 11/2008 | Berg |
| 2008/0282626 | A1 | 11/2008 | Powers, Jr. |
| 2008/0289265 | A1 | 11/2008 | Lessard |
| 2008/0295443 | A1 | 12/2008 | Simmons |
| 2008/0295450 | A1 | 12/2008 | Yogev |
| 2009/0031652 | A1 | 2/2009 | Ortega Gatalan |
| 2009/0038764 | A1 | 2/2009 | Pilz |
| 2009/0053989 | A1 | 2/2009 | Lunde et al. |
| 2009/0064611 | A1 | 3/2009 | Hall et al. |
| 2009/0077916 | A1 | 3/2009 | Scuderi et al. |
| 2009/0090074 | A1 | 4/2009 | Klein |
| 2009/0100760 | A1 | 4/2009 | Ewing |
| 2009/0100769 | A1 | 4/2009 | Barrett |
| 2009/0100796 | A1 | 4/2009 | Denn et al. |
| 2009/0107065 | A1 | 4/2009 | LeBlang |
| 2009/0113820 | A1 | 5/2009 | Deans |
| 2009/0134287 | A1 | 5/2009 | Klosowski |
| 2009/0165399 | A1 | 7/2009 | Campos Gines |
| 2009/0188192 | A1 | 7/2009 | Studebaker et al. |
| 2009/0188193 | A1 | 7/2009 | Studebaker et al. |
| 2009/0205277 | A1 | 8/2009 | Gibson |
| 2009/0249714 | A1 | 10/2009 | Combs et al. |
| 2009/0277122 | A1 | 11/2009 | Howery et al. |
| 2009/0282766 | A1 | 11/2009 | Roen |
| 2009/0283359 | A1 | 11/2009 | Ravnaas |
| 2009/0293395 | A1 | 12/2009 | Porter |
| 2009/0313931 | A1 | 12/2009 | Porter |
| 2010/0011699 | A1 | 1/2010 | Weimer et al. |
| 2010/0050556 | A1 | 3/2010 | Burns |
| 2010/0058686 | A1 | 3/2010 | Henriquez |
| 2010/0064590 | A1 | 3/2010 | Jones et al. |
| 2010/0064601 | A1 | 3/2010 | Napier |
| 2010/0065543 | A1 | 3/2010 | Dubey et al. |
| 2010/0146874 | A1 | 6/2010 | Brown |
| 2010/0146893 | A1 | 6/2010 | Dickinson |
| 2010/0186313 | A1 | 7/2010 | Stanford et al. |
| 2010/0212255 | A1 | 8/2010 | Lesoine |
| 2010/0218443 | A1 | 9/2010 | Studebaker |
| 2010/0229472 | A1 | 9/2010 | Malpas |
| 2010/0235206 | A1 | 9/2010 | Miller et al. |
| 2010/0263308 | A1 | 10/2010 | Olvera |
| 2010/0275544 | A1 | 11/2010 | Studebaker et al. |
| 2010/0313518 | A1 | 12/2010 | Berg |
| 2010/0325971 | A1 | 12/2010 | Leahy |
| 2010/0325989 | A1 | 12/2010 | Leahy |
| 2011/0023381 | A1 | 2/2011 | Weber |
| 2011/0041411 | A1 | 2/2011 | Aragon |
| 2011/0056147 | A1 | 3/2011 | Beaudet |
| 2011/0113709 | A1 | 5/2011 | Pilz |
| 2011/0113715 | A1 | 5/2011 | Tonyan et al. |
| 2011/0126484 | A1 | 6/2011 | Carrion et al. |
| 2011/0146180 | A1 | 6/2011 | Klein |
| 2011/0154766 | A1 | 6/2011 | Kralic et al. |

(56) References Cited

U.S. PATENT DOCUMENTS

| | | | |
|---|---|---|---|
| 2011/0162167 | A1 | 7/2011 | Blais |
| 2011/0219720 | A1 | 9/2011 | Strickland et al. |
| 2011/0247281 | A1 | 10/2011 | Pilz et al. |
| 2011/0258953 | A1 | 10/2011 | Finkelshteyn et al. |
| 2011/0268916 | A1 | 11/2011 | Pardue, Jr. |
| 2011/0277405 | A1 | 11/2011 | Bowron |
| 2011/0296769 | A1 | 12/2011 | Collins et al. |
| 2011/0296778 | A1 | 12/2011 | Collins et al. |
| 2011/0296789 | A1 | 12/2011 | Collins et al. |
| 2011/0300386 | A1 | 12/2011 | Pardue, Jr. |
| 2012/0073227 | A1 | 3/2012 | Urusoglu |
| 2012/0096800 | A1 | 4/2012 | Berg |
| 2012/0110947 | A1 | 5/2012 | Simmons |
| 2012/0137610 | A1 | 6/2012 | Knight et al. |
| 2012/0151869 | A1 | 6/2012 | Miller |
| 2012/0167505 | A1 | 7/2012 | Krause |
| 2012/0186174 | A1 | 7/2012 | LeBlang |
| 2012/0210658 | A1 | 8/2012 | Logan |
| 2012/0291378 | A1 | 11/2012 | Schroeder et al. |
| 2012/0297712 | A1 | 11/2012 | Lutzner et al. |
| 2012/0317923 | A1 | 12/2012 | Herdt et al. |
| 2013/0025220 | A1 | 1/2013 | Yu et al. |
| 2013/0025222 | A1 | 1/2013 | Mueller |
| 2013/0025966 | A1 | 1/2013 | Nam et al. |
| 2013/0036688 | A1 | 2/2013 | Gosain |
| 2013/0067832 | A1 | 3/2013 | Collins et al. |
| 2013/0111840 | A1 | 5/2013 | Bordener |
| 2013/0133277 | A1 | 5/2013 | Lewis |
| 2013/0232887 | A1 | 9/2013 | Donnini |
| 2014/0013678 | A1 | 1/2014 | Deverini |
| 2014/0013684 | A1 | 1/2014 | Kelly |
| 2014/0013695 | A1 | 1/2014 | Wolynski et al. |
| 2014/0047780 | A1 | 2/2014 | Quinn et al. |
| 2014/0059960 | A1 | 3/2014 | Cole |
| 2014/0069035 | A1 | 3/2014 | Collins |
| 2014/0069040 | A1 | 3/2014 | Gibson |
| 2014/0069050 | A1 | 3/2014 | Bolin |
| 2014/0083046 | A1 | 3/2014 | Yang |
| 2014/0090323 | A1 | 4/2014 | Glancy |
| 2014/0130441 | A1 | 5/2014 | Sugihara et al. |
| 2014/0317841 | A1 | 10/2014 | DeJesus et al. |
| 2014/0338280 | A1 | 11/2014 | Tanaka et al. |
| 2015/0007415 | A1 | 1/2015 | Kalinowski |
| 2015/0047807 | A1 | 2/2015 | Fiedrich |
| 2015/0093184 | A1 | 4/2015 | Henry |
| 2015/0096251 | A1 | 4/2015 | McCandless et al. |
| 2015/0121797 | A1 | 5/2015 | Brown et al. |
| 2015/0128518 | A1 | 5/2015 | Knight et al. |
| 2015/0136361 | A1 | 5/2015 | Gregory |
| 2015/0152634 | A1 | 6/2015 | Unger |
| 2015/0211227 | A1 | 7/2015 | Collins et al. |
| 2015/0233108 | A1 | 8/2015 | Eggleston, II et al. |
| 2015/0252558 | A1 | 9/2015 | Chin |
| 2015/0284950 | A1 | 10/2015 | Stramandinoli |
| 2015/0297926 | A1 | 10/2015 | Dzegan |
| 2015/0300008 | A1 | 10/2015 | Gosling et al. |
| 2015/0308096 | A1 | 10/2015 | Merhi et al. |
| 2016/0002912 | A1 | 1/2016 | Doupe et al. |
| 2016/0017609 | A1 | 1/2016 | Bottin |
| 2016/0053475 | A1 | 2/2016 | Locker et al. |
| 2016/0122996 | A1 | 5/2016 | Timberlake et al. |
| 2016/0145933 | A1 | 5/2016 | Condon et al. |
| 2016/0258160 | A1 | 9/2016 | Radhouane et al. |
| 2016/0290030 | A1 | 10/2016 | Collins et al. |
| 2016/0298326 | A1 | 10/2016 | Woznuk |
| 2016/0319534 | A1 | 11/2016 | Bernardo |
| 2017/0037613 | A1 | 2/2017 | Collins et al. |
| 2017/0044767 | A1 | 2/2017 | Gloftis et al. |
| 2017/0268228 | A1 | 9/2017 | Bergman |
| 2017/0284095 | A1 | 10/2017 | Collins et al. |
| 2017/0299198 | A1 | 10/2017 | Collins et al. |
| 2017/0306624 | A1 | 10/2017 | Graham et al. |
| 2017/0306625 | A1 | 10/2017 | Collins et al. |
| 2017/0342710 | A1 | 11/2017 | Gaydos et al. |
| 2017/0342735 | A1 | 11/2017 | Collins et al. |
| 2018/0038103 | A1 | 2/2018 | Neumayr |
| 2018/0135295 | A1 | 5/2018 | Bowron |
| 2018/0148926 | A1 | 5/2018 | Lake |
| 2018/0148928 | A1 | 5/2018 | Bergman et al. |
| 2018/0209136 | A1 | 7/2018 | Aylward et al. |
| 2018/0223521 | A1 | 8/2018 | Uno et al. |
| 2018/0291613 | A1 | 10/2018 | Jackson et al. |
| 2018/0328056 | A1 | 11/2018 | Collins et al. |
| 2019/0003172 | A1 | 1/2019 | Vanker et al. |
| 2019/0032327 | A1 | 1/2019 | Musson |
| 2019/0048571 | A1 | 2/2019 | Cohen |
| 2019/0093356 | A1 | 3/2019 | Collins et al. |
| 2019/0119908 | A1 | 4/2019 | Petricca |
| 2019/0136508 | A1 | 5/2019 | Chaillan |
| 2019/0249409 | A1 | 8/2019 | Boyd et al. |
| 2020/0040594 | A1 | 2/2020 | Hedberg |
| 2020/0123761 | A1 | 4/2020 | Garcia-Abril Ruiz et al. |
| 2020/0224407 | A1 | 7/2020 | Ng |

FOREIGN PATENT DOCUMENTS

| | | |
|---|---|---|
| AU | 2017203899 | 1/2018 |
| CN | 1106725 | 8/1995 |
| CN | 1313921 | 9/2001 |
| CN | 1234087 | 11/2002 |
| CN | 1742144 | 3/2006 |
| CN | 20137279 | 3/2008 |
| CN | 101426986 | 5/2009 |
| CN | 101821462 | 9/2010 |
| CN | 101831963 | 9/2010 |
| CN | 101925710 | 12/2010 |
| CN | 201687147 | 12/2010 |
| CN | 102105642 | 6/2011 |
| CN | 201952944 | 8/2011 |
| CN | 102227535 | 10/2011 |
| CN | 102282324 | 12/2011 |
| CN | 202117202 | 1/2012 |
| CN | 102459775 | 5/2012 |
| CN | 102587693 | 7/2012 |
| CN | 202299241 | 7/2012 |
| CN | 202391078 | 8/2012 |
| CN | 102733511 | 10/2012 |
| CN | 103410223 | 11/2013 |
| CN | 103572836 | 2/2014 |
| CN | 103821276 | 5/2014 |
| CN | 104499565 | 4/2015 |
| CN | 204475520 | 7/2015 |
| CN | 205024827 | 2/2016 |
| CN | 205024886 | 2/2016 |
| CN | 105714939 | 6/2016 |
| CN | 205604488 | 9/2016 |
| CN | 106065663 | 11/2016 |
| CN | 206070761 | 4/2017 |
| CN | 206070835 | 4/2017 |
| CN | 206189811 | 5/2017 |
| CN | 106836502 | 6/2017 |
| CN | 206245595 | 6/2017 |
| CN | 206418587 | 8/2017 |
| CN | 107246094 | 10/2017 |
| CN | 206800641 | 12/2017 |
| CN | 108286308 | 7/2018 |
| CN | 108331173 | 7/2018 |
| CN | 108487464 | 9/2018 |
| CN | 109944328 | 6/2019 |
| DE | 2546932 | 4/1977 |
| DE | 4205812 | 9/1993 |
| DE | 9419429 | 2/1995 |
| DE | 29716050 | 10/1997 |
| DE | 19740131 | 4/1999 |
| DE | 20002775 | 8/2000 |
| DE | 19921837 | 9/2000 |
| DE | 19918153 | 11/2000 |
| DE | 20315506 | 11/2004 |
| DE | 202008007139 | 10/2009 |
| DE | 202014002800 | 5/2014 |
| DE | 202014105038 | 1/2016 |
| EP | 0612896 | 8/1994 |
| EP | 0843053 | 5/1998 |
| EP | 1045078 | 10/2000 |

(56) References Cited

FOREIGN PATENT DOCUMENTS

| | | |
|---|---|---|
| EP | 1375804 | 1/2004 |
| EP | 1568828 | 8/2005 |
| EP | 1683923 | 7/2006 |
| EP | 2128353 | 12/2009 |
| EP | 2213808 | 8/2010 |
| EP | 2238872 | 10/2010 |
| EP | 1739246 | 1/2011 |
| EP | 2281964 | 2/2011 |
| EP | 3133220 | 2/2017 |
| EP | 3426858 | 4/2022 |
| FR | 1317681 | 5/1963 |
| FR | 2881153 | 7/2006 |
| FR | 2988749 | 10/2013 |
| FR | 2765906 | 1/2019 |
| GB | 898905 | 6/1962 |
| GB | 2446878 | 8/2008 |
| GB | 2481126 | 12/2011 |
| GB | 2507365 | 4/2014 |
| GB | 2558272 | 7/2018 |
| JP | S46-006980 | 12/1971 |
| JP | 47-45915 | 1/1974 |
| JP | S496615 | 1/1974 |
| JP | S49-104111 | 9/1974 |
| JP | 49-29274 | 9/1975 |
| JP | 53-000014 | 1/1978 |
| JP | 53-156364 | 12/1978 |
| JP | 52-104868 | 3/1979 |
| JP | 54-084112 | 6/1979 |
| JP | S54-145910 | 11/1979 |
| JP | 56-131749 | 10/1981 |
| JP | 57-158451 | 9/1982 |
| JP | S59-065126 | 5/1984 |
| JP | S60-019606 | 2/1985 |
| JP | 61-144151 | 9/1986 |
| JP | S61-201407 | 12/1986 |
| JP | S6358035 | 3/1988 |
| JP | 63-162034 | 10/1988 |
| JP | S62-55189 | 10/1988 |
| JP | 01-151502 | 10/1989 |
| JP | H01-153013 | 10/1989 |
| JP | S63-43155 | 10/1989 |
| JP | 1-37047 | 11/1989 |
| JP | 02-157350 | 6/1990 |
| JP | H03 10985 | 1/1991 |
| JP | H0460031 | 2/1992 |
| JP | H049373 | 3/1992 |
| JP | 6-12178 | 2/1994 |
| JP | 06-212721 | 8/1994 |
| JP | H06-220932 | 8/1994 |
| JP | H07-173893 | 7/1995 |
| JP | H07279238 | 10/1995 |
| JP | 07309551 | 11/1995 |
| JP | H0752887 | 12/1995 |
| JP | 08000058 | 1/1996 |
| JP | H08189078 | 7/1996 |
| JP | 8-326158 | 12/1996 |
| JP | H09228510 | 9/1997 |
| JP | 2576409 Y2 | 7/1998 |
| JP | 10234493 | 9/1998 |
| JP | H10245918 | 9/1998 |
| JP | 11-117429 | 4/1999 |
| JP | H11-100926 | 4/1999 |
| JP | 2000-34801 | 2/2000 |
| JP | 2000144997 | 5/2000 |
| JP | 2000-160861 | 6/2000 |
| JP | 3137760 | 2/2001 |
| JP | 2001-107500 | 4/2001 |
| JP | 3257111 | 2/2002 |
| JP | 2002-309665 | 10/2002 |
| JP | 2002-309691 | 10/2002 |
| JP | 2002536615 | 10/2002 |
| JP | 2002364104 | 12/2002 |
| JP | 2003-505624 | 2/2003 |
| JP | 2003064811 | 3/2003 |
| JP | 2003-278300 | 10/2003 |
| JP | 2003-293493 | 10/2003 |
| JP | 2004108031 | 4/2004 |
| JP | 2004-344194 | 12/2004 |
| JP | 3664280 | 6/2005 |
| JP | 2006-029064 | 2/2006 |
| JP | 2006-161406 | 6/2006 |
| JP | 2007-039915 | 2/2007 |
| JP | 3940621 | 7/2007 |
| JP | 2007-290810 | 11/2007 |
| JP | 2008-063753 | 3/2008 |
| JP | 2008073434 | 4/2008 |
| JP | 2008-121376 | 5/2008 |
| JP | 2008110104 | 5/2008 |
| JP | 2009035881 | 2/2009 |
| JP | 2009-257713 | 11/2009 |
| JP | 2010-185264 | 8/2010 |
| JP | 2011-032802 | 2/2011 |
| JP | 2012-077463 | 4/2012 |
| JP | 3187449 | 11/2013 |
| JP | 2015-038301 | 2/2015 |
| JP | 2015-117502 | 6/2015 |
| JP | 2017071995 | 4/2017 |
| JP | 2017-203285 | 11/2017 |
| JP | 6820939 | 1/2021 |
| KR | 1019990052255 | 7/1999 |
| KR | 1019990053902 | 7/1999 |
| KR | 100236196 | 12/1999 |
| KR | 102000200413000 | 10/2000 |
| KR | 1020020041064 | 6/2002 |
| KR | 20060066931 | 6/2006 |
| KR | 20080003326 | 8/2008 |
| KR | 20-2008-0003326 | 7/2012 |
| KR | 10-2013-0021316 | 3/2013 |
| KR | 1020140034860 | 3/2014 |
| KR | 10-1424764 | 8/2014 |
| KR | 101481790 | 1/2015 |
| KR | 101705260 | 2/2017 |
| KR | 10-1875076 | 7/2018 |
| KR | 20180092677 | 8/2018 |
| KR | 10-2018-0117137 | 10/2018 |
| KR | 10-2018-0121567 | 11/2018 |
| KR | 10-2018-0121570 | 11/2018 |
| TW | 202026497 | 7/2020 |
| TW | 1760652 | 4/2022 |
| WO | 1991007557 | 5/1991 |
| WO | 1997022770 | 6/1997 |
| WO | 200046457 | 8/2000 |
| WO | 0058583 | 10/2000 |
| WO | 2002035029 | 5/2002 |
| WO | 2006/091864 | 8/2006 |
| WO | 2007059003 | 5/2007 |
| WO | 2007/080561 | 7/2007 |
| WO | 2008/113207 | 9/2008 |
| WO | 2010030060 | 3/2010 |
| WO | 2010037938 | 4/2010 |
| WO | 2011/015681 | 2/2011 |
| WO | 2011/116622 | 9/2011 |
| WO | 2013/153491 | 10/2013 |
| WO | 2014/089611 | 6/2014 |
| WO | 2015/051551 | 4/2015 |
| WO | 2016032537 | 3/2016 |
| WO | 2016032538 | 3/2016 |
| WO | 2016032539 | 3/2016 |
| WO | 2016032540 | 3/2016 |
| WO | 2016033429 | 3/2016 |
| WO | 2016033525 | 3/2016 |
| WO | 2017/123270 | 7/2017 |
| WO | 2017/156006 | 9/2017 |
| WO | 2017/156011 | 9/2017 |
| WO | 2017/156016 | 9/2017 |
| WO | WO-2017220653 A1 * | 12/2017 ............ B66B 19/00 |

OTHER PUBLICATIONS

U.S. Appl. No. 12/796,603, filed Jun. 8, 2010, Collins et al.

"Beam to column connection", TATA Steel, http://www.tatasteelconstruction.com/en/reference/teaching_resources/architectural_

(56) References Cited

OTHER PUBLICATIONS studio_reference/elements/connections/beam to column connections, 2014, 4 Pages.
"Emerging Trends 2012 Executive Summary", Urban Land Institute, Ch. 1, 2011, 1-11 Pages.
"Emerging Trends in real estate", accessed on Sep. 15, 2016 at https://web.archive.orglweb120140813084823/http://pwc.corn.au/industry/real-estate/assets/Real-Estate-2012-Europe-Jan12.pdf, pp. 60 (2012).
"How to Soundproof a Ceiling—Soundproofing Ceilings", http://www.soundproofingcompany.com/soundproofing-solutions/soundproof-a-cciling/, Apr. 2, 2014, 1-7 Pages.
"Insulspan Installation Guide", Obtained at: http://www.insuispan.comidownloads:InstallationGuide,pdf on Feb. 2, 2016, 58 pages.
"Structural Insulated Panel", Wikipedia, http://www.en.wikipedia.org//wiki/Structural_insulated_panel, May 30, 2014, 5 Pages.
"Structural Insulated Panels", SIP Solutions, http://www.sipsolutions.com/content/structuralinsulated-panels, Aug. 15, 2014, 3 pages.
"US Apartment & Condominium Construction Forecast 2003-2017", Statista, Inc., Jun. 2012, 8 Pages.
Azari, et al., "Modular Prefabricated Residential Construction—Constraints and Opportunities", PNCCRE Technical Report #TR002, Aug. 2013, 90 Pages.
Borzouie, Jamaledin, et al., "Seismic Assesment and Reahbilitation of Diaphragms", http://www.nosazimadares.ir/behsazi/15WCEE2012/URM/1/Roof.pdf, Dec. 31, 2011, 86 Pages.
EPO, Extended European Search Report for European Application No. EP 15836516.3, Jun. 22, 2018, 1 page.
EPO, European Search Report in PCT/US2015/047383 mailed Jun. 22, 2018, 10 Pages.
EPO, Extended European Search Report for European Patent Application No. 20201601.0, Mar. 16, 2021, 10 pages.
EPO, Extended European Search Report for European Patent Application No. 17763914.3, Nov. 19, 2019, 10 pages.
EPO, Extended European Search Report for European Patent Application No. 17763910.1, Jan. 28, 2020, 13 pages.
EPO, Extended European Search Report for European Patent Application No. 17763907.7, Sep. 13, 2019, 13 pages.
EPO, Partial European Search Report for European Patent Application No. 17763910.1, Oct. 17, 2019, 16 pages.
EPO, European Search Report received for POT 14891125.8-1604/3011122 dated Jul. 8, 2016, 4 pages.
EPO, Extended European Search Report for European Patent Application No. 17763913.5, Oct. 16, 2019, 8 pages.
EPO, "Extended European Search Report for European Patent Application No. 14900469", Mar. 20, 2018, 1-8.
Framecad, "FC EW 1-12mm Fibre Cement Sheet + 9mm MgO Board Wall Assembly", 2013, 2 pages.
Giles, et al., "Innovations in the Development of Industrially Designed and Manufactured Modular Concepts for Low-Energy, Multi-Story, High Density, Prefabricated Affordable Housing", Innovations in the Development of Industrially Designed and Manufactured Modular Concepts, 2006, 1-15 Pages.
Gonchar, "Paradigm Shift—Multistory Modular", Architectural Record, Oct. 2012, 144-148 Pages.
Kerin, et al., "National Apartment Market Report—2013", Marcus & Millichap, 2013, 1-9 pages.
M.A. Riusillo, "Lift Slab Construction: Its History, Methodology, Economics and Applications", ACI-Abstract, Jun. 1, 1988, 2 pages.
McIlwain, "Housing in America—The Next Decade", Urban Land Institute, 2010, 1-28 Page.
McIlwain, "The Rental Boost From Green Design", Urban Land, http://urbanland.uli.org/sustainability/the-rental-boost-from-green-design/, Jan. 4, 2012, 1-6 Pages.
Shashaty, Andre, "Housing Demand", Sustainable Communities, Apr. 2011, 14-18 Pages.
Sichelman, "Severe Apartment Shortage Looms", Urban Land, http://urbanland.uli.org/capital-markets/nahb-orlando-severe-apartment shortage-looms/, Jan. 13, 2011, 1-2 Pages.
Stiemer, S F, "Bolted Beam-col. Connections", http://faculty.philau.edu/pastorec/Tensile/bolted_beam_column_connections.pdf, Nov. 11, 2007, 1-16 Pages.
WIPO, International Search Report and Written opinion for International Application No. PCT/US/2014/053614 mailed on Dec. 18, 2014, 11 pages.
WIPO, International Search Report and Written opinion for International Application No. PCT/US/2014/053615 mailed on Dec. 17, 2014, 11 pages.
WIPO, International Search Report and Written Opinion mailed for International application No. PCT/US2014/053614 on Dec. 18, 2014, 11 pages.
WIPO, International Search Report and Written Opinion mailed for International application No. PCT/US2014/053615 on Dec. 17, 2014, 11 Pages.
WIPO, International Search Report and Written Opinion mailed for International application No. PCT/US2019/031370, Aug. 7, 2019, 11 pages.
WIPO, International Search Report for International Patent Application No. PCT/US2017/021174, Jun. 26, 2017, 11 pages.
WIPO, International Search Report and Written opinion for International Application No. PCT/US/2014/053613 mailed on Dec. 18, 2014, 13 Pages.
WIPO, International Search Report and Written Opinion mailed for International application No. PCT/US2014/053613 on Dec. 18, 2014, 13 pages.
WIPO, International Search Report and Written Opinion for International Application No. PCT/US2011/001039 mailed on Oct. 5, 2011, 14 Pages.
WIPO, International Search Report and Written opinion for International Application No. PCT/US2015/047383 mailed on Jan. 12, 2016, 14 Pages.
WIPO, International Search Report and Written opinion for International Application No. PCT/US2015/047536 mailed on Dec. 4, 2015, 17 Pages.
WIPO, International Search Report and Written Opinion mailed for International application No. PCT/US2015/047536 on Dec. 4, 2015, 17 Pages.
WIPO, International Search Report for International Patent Application No. PCT/US2017/021168, May 19, 2017, 5 pages.
WIPO, Written Opinion for International Patent Application No. PCT/US2017/021174, Jun. 26, 2017, 6 pages.
WIPO, International Search Report for International Patent Application No. PCT/US2017/021179, May 25, 2017, 7 pages.
WIPO, Written Opinion for International Patent Application No. PCT/US2017/021179, May 25, 2017, 7 pages.
WIPO, International Search Report of International Patent Application No. PCT/US2017/021177, Jun. 5, 2017, 8 pages.
WIPO, Written Opinion of International Patent Application No. PCT/US2017/021177, Jun. 5, 2017, 8 pages.
WIPO, Written Opinion for International Patent Application No. PCT/US2017/021168, May 19, 2017, 8 pages.
WIPO, International Search Report and Written opinion for International Application No. PCT/US/2014/053616 mailed on Dec. 17, 2014, 9 Pages.
WIPO, International Search Report and Written Opinion for PCT Application No. PCT/US2011/001039 mailed on Oct. 5, 2011, 9 Pages.
WIPO, International Search Report and Written Opinion mailed for International application No. PCT/US2014/053616 on Dec. 17, 2014, 9 Pages.
WIPO, International Search Report and Written Opinion for PCT Application No. PCT/US2019/038557, Sep. 4, 2019, 67 pages.
WIPO, Written Opinion for International Patent Application No. PCT/US2021/056081, Jan. 31, 2022, 8 pages.
WIPO, Written Opinion for International Patent Application No. PCT/US2021/056086, Jan. 31, 2022, 5 pages.
WIPO, International Search Report for International Patent Application No. PCT/US2021/056086, Jan. 31, 2022, 2 pages.
WIPO, Written Opinion for International Patent Application No. PCT/US2021/056076, Jan. 28, 2022, 8 pages.
WIPO, International Search Report for International Patent Application No. PCT/US2021/056076, Jan. 28, 2022, 2 pages.

(56) References Cited

OTHER PUBLICATIONS

WIPO, Written Opinion for International Patent Application No. PCT/US2021/056080, Jan. 24, 2022, 8 pages.
WIPO, International Search Report for International Patent Application No. PCT/US2021/056081, Jan. 31, 2022, 2 pages.
WIPO, International Search Report for International Patent Application No. PCT/US2021/056074, Jan. 18, 2022, 2 pages.
WIPO, Written Opinion for International Patent Application No. PCT/US2021/056074, Jan. 18, 2022, 6 pages.
WIPO, Written Opinion for International Patent Application No. PCT/US2021/056091, Jan. 21, 2022, 4 pages.
WIPO, International Search Report for International Patent Application No. PCT/US2021/056079, Jan. 21, 2022, 2 pages.
WIPO, International Search Report for International Patent Application No. PCT/US2021/056091, Jan. 21, 2022, 2 pages.
WIPO, Written Opinion for International Patent Application No. PCT/US2021/056079, Jan. 21, 2022, 6 pages.
WIPO, International Search Report for International Patent Application No. PCT/US2021/056077, Jan. 24, 2022, 2 pages.
WIPO, International Search Report for International Patent Application No. PCT/US2021/056080, Jan. 24, 2022, 2 pages.
WIPO, Written Opinion for International Patent Application No. PCT/US2021/056077, Jan. 24, 2022, 5 pages.
Clark Dietrich, "Furring Channel / Hat Channel", https://www.clarkdietrich.com/products/furring-channel-hat-channel, 2023.
JPO, Notice of Reasons for Refusal (with English translation) for Japanese Patent Application No. 2023-112137, Sep. 10, 2024, 8 pages.

* cited by examiner

100

MODULAR STAIRWELL AND ELEVATOR SHAFT SYSTEM AND METHOD

RELATED APPLICATIONS

This application is the U.S. national phase filing under 35 U.S.C. § 371 of International Patent Application No. PCT/US2019/031370, filed on May 8, 2019, which claims the benefit under 35 U.S.C. § 119 (e) of U.S. Application No. 62/767,339, entitled "Modular Stairwell and Elevator Shaft System and Method," and filed on Nov. 14, 2018, which is incorporated herein by reference in its entirety.

BACKGROUND

The construction industry is increasingly using modular construction techniques to improve efficiency. However, some aspects of construction, such as traditional stairwell and elevator shaft construction, may still present challenges to improving construction efficiency.

Workplace safety regulations, other rules, or industry practices may require all personnel in a building (or in an area of a building under construction) having an incomplete stairwell or elevator shaft installed to wear safety harnesses, which may increase labor costs and reduce time efficiencies. Further, installation of traditional stairwell and elevator components at a building construction site may be time consuming and require skilled tradespeople and specialized equipment.

SUMMARY

Some implementations can include a prefabricated modular stairwell and elevator shaft system, and methods to make and install the same.

Some implementations can include a modular stairwell and elevator shaft system comprising a first side panel having an elevator door and an elevator door frame, wherein the first side panel is operable to span vertically between a first pair of adjacent corbel beams, and wherein the first side panel includes stair and handrail support components, and a second side panel having a stairwell door and a stairwell door frame, wherein the second side panel is operable to span vertically between a second pair of adjacent corbel beams, and wherein the first side panel includes stair and handrail support components. The system can further comprise an end panel operable to span vertically between a third pair of adjacent corbel beams. The system can further comprise a first elevator shaft panel including first elevator components, and a second elevator shaft panel including second elevator components.

The system can also comprise one or more stairwell treads configured to attach to the stair and handrail support components, one or more stairwell handrails configured to attach to the stair and handrail support components, and one or more stairwell landings configured to attach to the stair and handrail support components.

In some implementations, the first side panel, the second side panel, and the end panel can have a first height, and the first elevator shaft panel and the second elevator shaft panel can each have a second height that is greater than the first height. In some implementations, the first height spans a portion of one story and the second height spans a portion of two stories.

In some implementations, the stair and handrail support components are installed on the first side panel, the second side panel, and the end panel prior to installation of the first side panel, the second side panel, and the end panel in a building. In some implementations, the first elevator shaft panel and the second elevator shaft panel are operable to attach to respective clips attached to corresponding corbel beams, and wherein the first elevator shaft panel and the second elevator shaft panel each include multiple light gauge members installed together to form one or more vertical framing members and one or more horizontal framing members.

In some implementations, the elevator door frame and the elevator door are installed in the first side panel prior to installation of the first side panel in a building.

In some implementations, the stairwell door frame and the stairwell door are installed in the second side panel prior to installation of the second side panel in a building.

In some implementations, the one or more stairwell treads, the one or more stairwell handrails, and the one or more stairwell landings are installed at a building construction site. In some implementations, the first elevator components include one or more counterweight rails, one or more counterweight brackets, and one or more elevator rail brackets.

In some implementations, the second elevator components include one or more elevator rail brackets.

The system can also comprise one or more elevator rails, wherein the one or more elevator rails are installed, at a building construction site, on respective elevator rail brackets that were installed on the first elevator shaft panel and the second elevator shaft panel prior to installation of the first elevator shaft panel and the second elevator shaft panel in a building at the building construction site.

Some implementations can include a method. The method can include forming a first side panel having an elevator door and an elevator door frame, wherein the first side panel is configured to span vertically between a first pair of adjacent corbel beams, and installing first stair and handrail support components on the first side panel. The method can also include forming a second side panel having a stairwell door and a stairwell door frame, wherein the second side panel is configured to span vertically between a second pair of adjacent corbel beams, and installing second stair and handrail support components on the second side panel. The method can further include forming an end panel configured to span vertically between a third pair of adjacent corbel beams.

The method can also include forming a first elevator shaft panel, and installing first elevator components on the first elevator shaft panel. The method can also include forming a second elevator shaft panel, and installing second elevator components on the second elevator shaft panel. In some implementations, the forming and installing are performed prior to the first side panel, second side panel, end panel, first elevator shaft panel, and second elevator shaft panel being installed in a building.

In some implementations, the first side panel, the second side panel, and the end panel are each formed to have a first height, and wherein the first elevator shaft panel and the second elevator shaft panel are each formed to have a second height that is greater than the first height.

In some implementations, the first height spans a portion of one story and the second height spans a portion of two stories. In some implementations, the first elevator shaft panel and the second elevator shaft panel are configured to attach to respective clips attached to corresponding corbel beams. In some implementations, the first elevator components include one or more counterweight rails, one or more counterweight brackets, and one or more elevator rail brackets. In some implementations, the second elevator components include one or more elevator rail brackets.

Some implementations can include a method. The method can include installing, in a building, a first side panel to span vertically between a first pair of adjacent corbel beams, wherein the first side panel includes an elevator door, an elevator door frame, and stair and handrail support components. The method can also include installing, in the building, a second side panel to span vertically between a second pair of adjacent corbel beams, wherein the first side panel includes a stairwell door frame, a stairwell door, and stair and handrail support components.

The method can further include installing, in the building, an end panel configured to span vertically between a third pair of adjacent corbel beams, and installing, in the building, a first elevator shaft panel having first elevator components that were attached to the first elevator shaft panel prior to the first elevator shaft panel being installed in the building, wherein the first elevator shaft panel is attached to one or more corbel beams via corresponding corbel beam clips.

The method can further include installing, in the building, a second elevator shaft panel having second elevator components that were attached to the second elevator shaft panel prior to the second elevator shaft panel being installed in the building, wherein the second elevator shaft panel is attached to one or more corbel beams via corresponding corbel beam clips. The method can also include attaching one or more stairwell treads to the stair and handrail support components, and attaching one or more stairwell handrails to the stair and handrail support components. The method can also include attaching one or more stairwell landings to the stair and handrail support components.

The method can also include installing, in the building, one or more elevator rails on respective elevator rail brackets on the first elevator shaft panel and the second elevator shaft panel. In some implementations, the first elevator components include one or more counterweight rails, one or more counterweight brackets, and one or more elevator rail brackets, and wherein the second elevator components include one or more elevator rail brackets.

DETAILED DESCRIPTION

Figure 1:
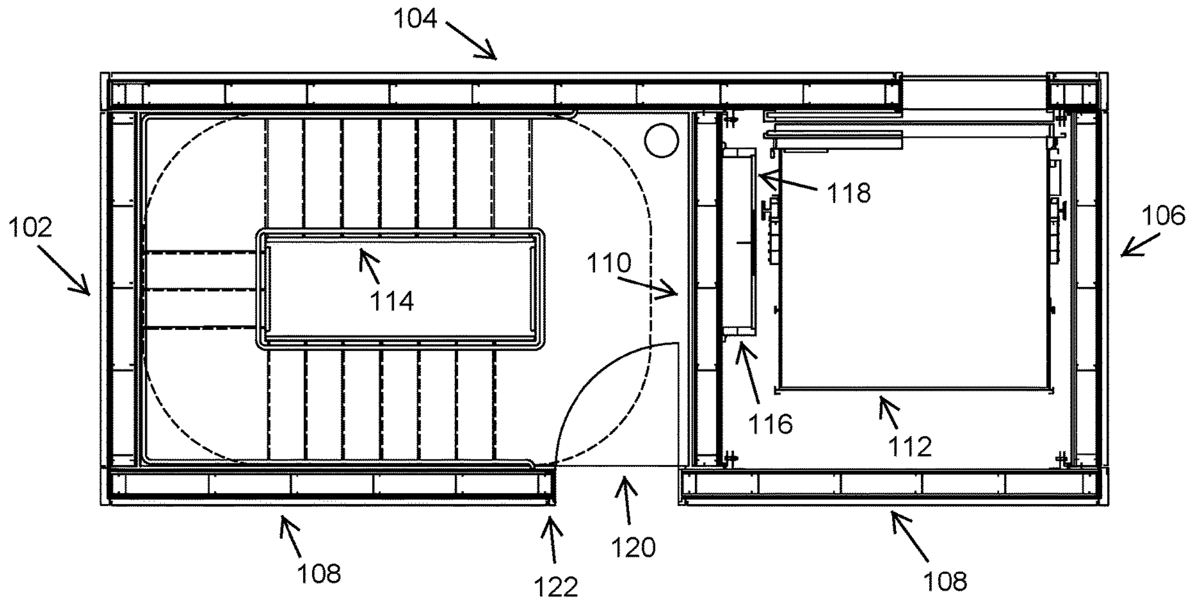
FIG. 1 is a top plan view diagram of an example modular stairwell and elevator shaft system in accordance with some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

This disclosure is drawn, inter alia, to methods, systems, products, devices, and/or apparatuses generally related to a modular stairwell and elevator shaft system.

In some embodiments, a building may have a modular stairwell and elevator shaft. In some embodiments, when the building is being constructed, prefabricated sections of the modular stairwell and elevator shaft may be installed. The prefabricated modular stairwell and elevator shaft sections may provide a portion of an interior of the building. In some embodiments, the prefabricated modular stairwell and elevator shaft sections may be coupled to one or more structural frame members of the building. In some embodiments, the modular stairwell and elevator shaft sections may be attached to the structural frame members to help align the structural frame members prior to exterior or interior wall panels being installed. In some embodiments, the modular stairwell and elevator shaft sections are coupled to a load-bearing structure of the building. For example, the load-bearing structure may be an external or internal construction steel frame.

In some embodiments, the material composition of the modular stairwell and elevator shaft sections may include steel. In some embodiments, the material composition may include aluminum. In still other embodiments, the modular stairwell and elevator shaft components may be made from a variety of building suitable materials ranging from metals and/or metal alloys, to wood and wood polymer composites (WPC), wood based products (lignin), other organic building materials (bamboo) to organic polymers (plastics), to hybrid materials, earthen materials such as ceramics. In some embodiments, cement or other pourable or moldable building materials may also be used. In other embodiments, any combination of suitable building material may be combined by using one building material for some elements of the modular stairwell and elevator shaft sections and other building materials for other elements of the modular stairwell and elevator shaft sections. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load, and environmental stresses can determine optimal economical choices of building materials used for components in the modular stairwell and elevator shaft system described herein. Availability of various building materials in different parts of the world may also affect selection of materials for building the system described herein. Adoption of the International Building Code or similar code may also affect choice of materials.

Any reference herein to "metal" includes any construction grade metals or metal alloys as may be suitable for fabrication and/or construction of the modular stairwell and elevator shaft sections and components described herein. Any reference to "wood" includes wood, wood laminated products, wood pressed products, wood polymer composites (WPCs), bamboo or bamboo related products, lignin products, and any plant derived product, whether chemically treated, refined, processed or simply harvested from a plant. Any reference herein to "concrete" includes any construction grade curable composite that includes cement, water, and a granular aggregate. Granular aggregates may include sand, gravel, polymers, ash and/or other minerals.

Turning now to the drawings, FIGS. 1-9 show diagrams of one or more example implementations of a prefabricated modular stairwell and elevator shaft system 100. As shown in the top plan view of FIG. 1, the prefabricated modular stairwell and elevator shaft system 100 includes an end panel 102, a first side panel 104, a second elevator shaft panel 106, a second side panel 108, and a first elevator shaft panel 110. The prefabricated modular stairwell and elevator shaft system 100 also includes an elevator car 112, stairwell components 114 (including one or more treads, one or more landings, and one or more handrails), one or more counterweight rails 116, one or more counterweight brackets 118, a stairwell door 120, and a stairwell door frame 122.

Figure 2:
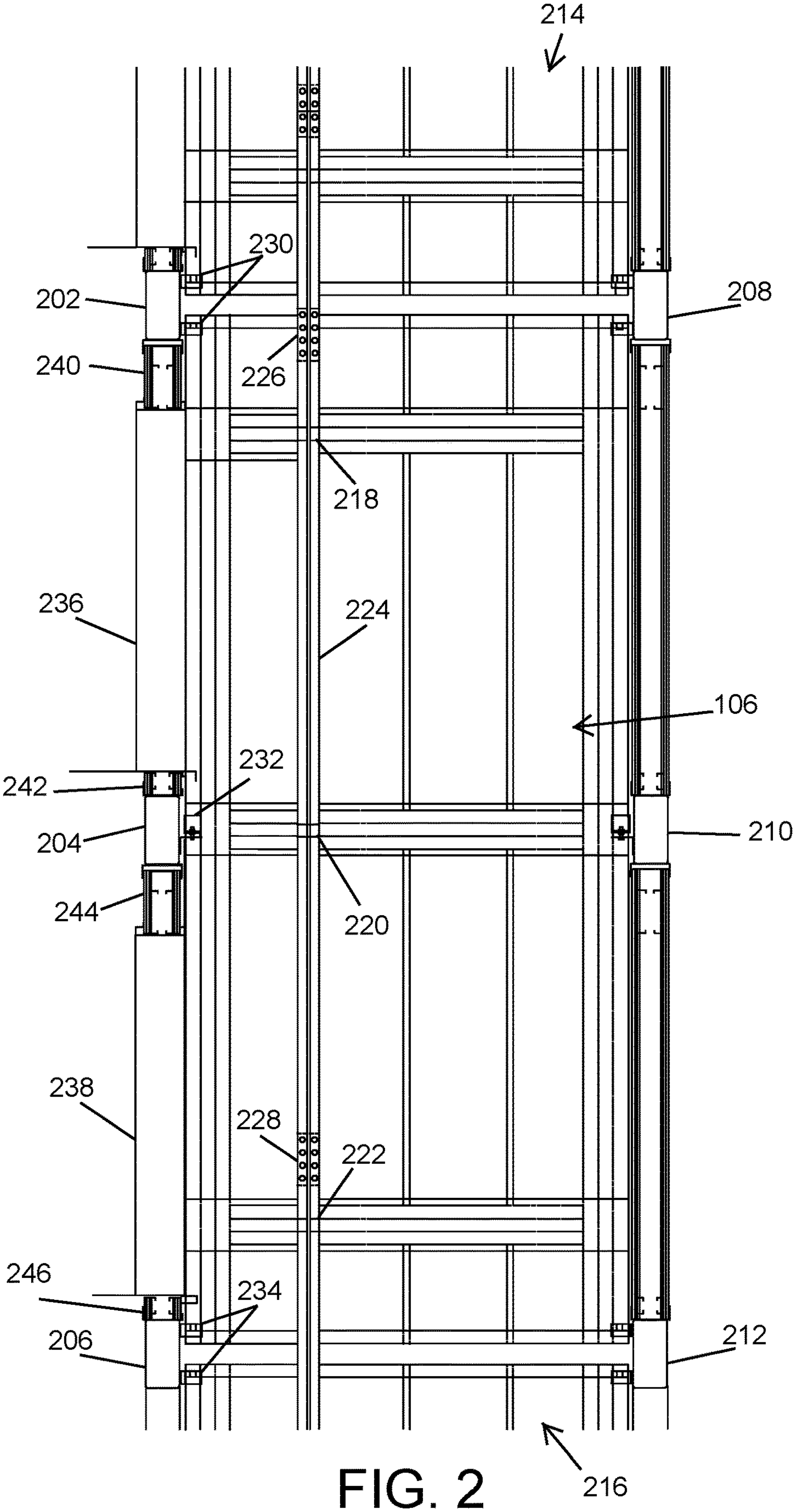
FIG. 2 is a diagram showing a side view of an example modular elevator shaft panel in accordance with some embodiments.

FIG. 2 is a diagram showing a side view of an example modular elevator shaft panel, specifically a second elevator shaft panel in accordance with some embodiments. In particular, FIG. 2 shows the second elevator shaft panel 106 installed in a building and attached to corbel beams (202, 204, 206, 208, 210, and 212) via corbel beam clips (230, 232, and 234, with corresponding clips on the opposite side). FIG. 2 also shows elevator doors 236 and 238 and elevator door frames 240, 242, 244, and 246). The elevator doors 236 and 238 are installed in the door frames 240-242 and 244-246, respectively. In some implementations, the elevator doors 236 and 238 can be installed in a corresponding side panel (e.g., 104) at a factory prior to delivery to and installation in corresponding side panel (e.g., 104) after the side panel is installed in a building at a building site. In some implementations, the elevator doors 236 and 238 can be installed at a building at a building site. Above the second elevator shaft panel 106 is another second elevator shaft panel 214, and below the second elevator shaft panel 106 is another second elevator shaft panel 216.

The second elevator shaft panel 106 can be made or formed in a factory and can be configured with second elevator components, such as elevator rail brackets 218, 220, and 222 at the factory. Once at a building construction site, an elevator rail 224 can be installed onto the elevator rail brackets 218-222. Sections of the elevator rail 224 can be joined together via fish plates 226 and 228.

Figure 3:
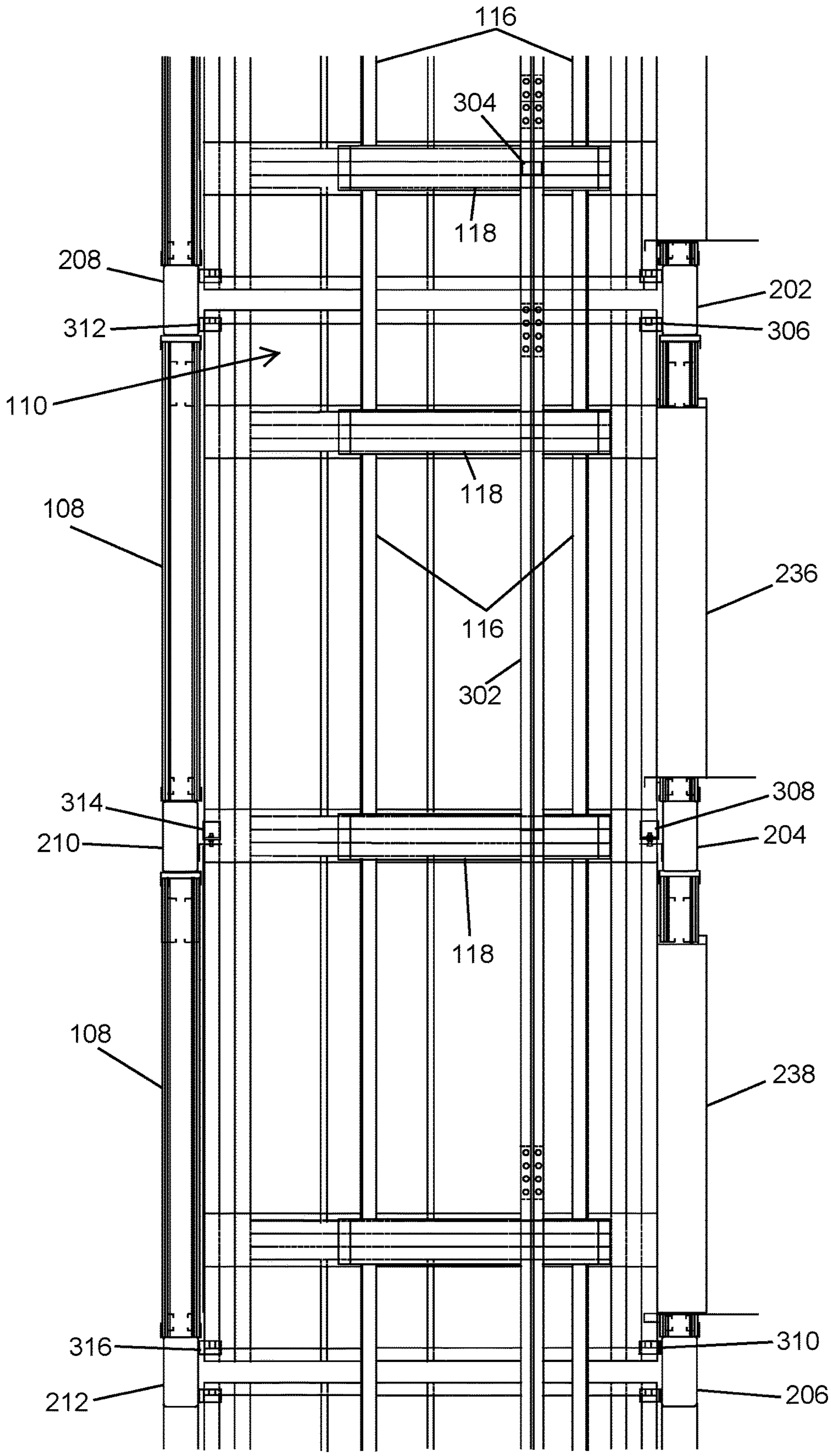
FIG. 3 is a diagram showing a side view of an example modular elevator shaft panel in accordance with some embodiments.

FIG. 3 is a diagram showing a side view of an example modular elevator shaft panel, specifically a first elevator shaft panel in accordance with some embodiments. As shown in FIG. 3, the first elevator shaft panel 110 is shown installed and attached to corbel beams (202, 204, 206, 208, 201, and 212) via corbel beam clips (306, 308, 310, 312, 314, and 316).

Also, the first elevator shaft panel 110 can include first elevator components such as the counterweight rails 116, counterweight bracket 118, elevator rail 302, and elevator rail bracket 304 that can be installed at a factory prior to the second elevator shaft panel being installed in a building.

Figure 4:
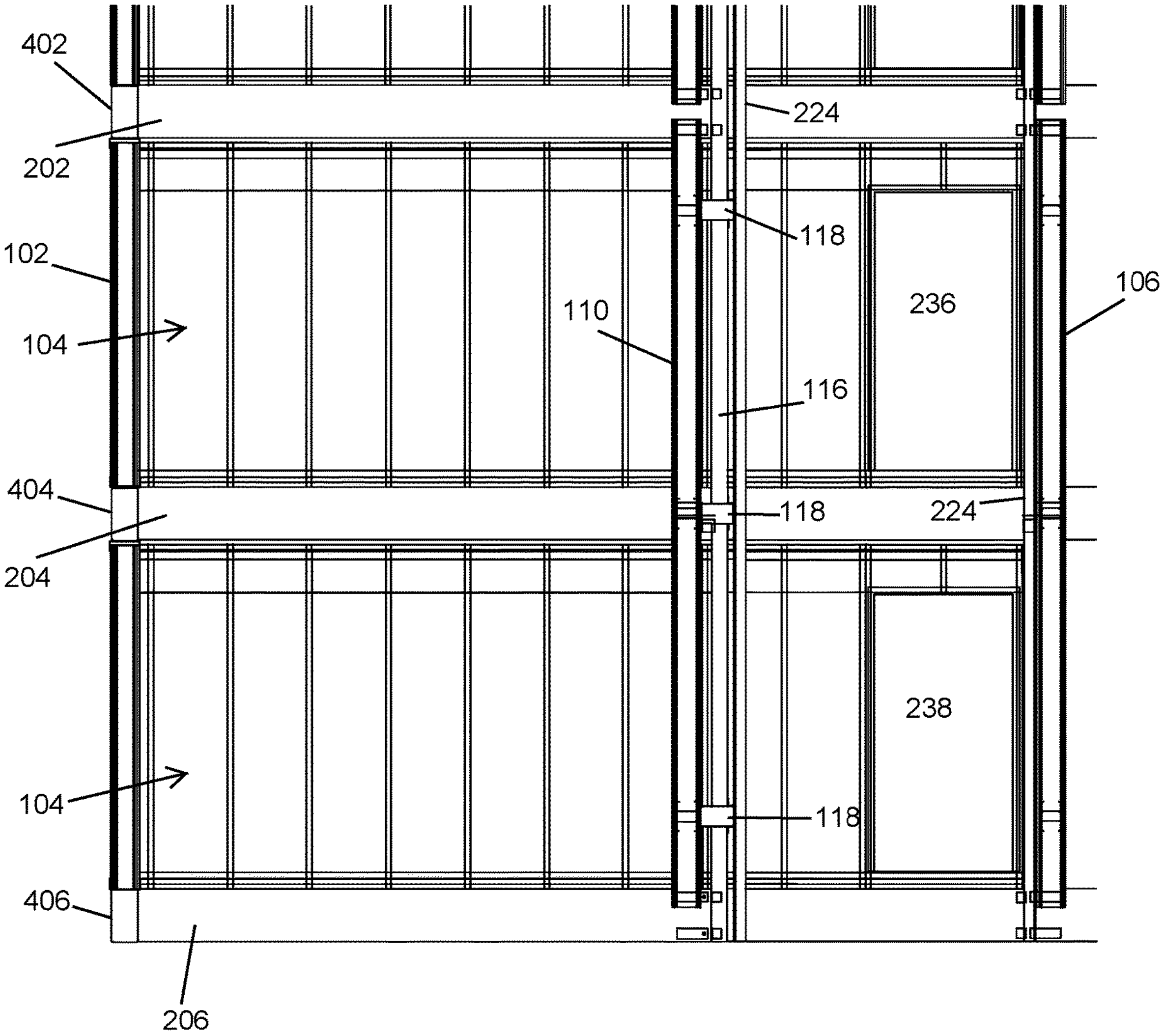
FIG. 4 is a diagram showing a side sectional view of an example modular stairwell and elevator shaft system in accordance with some embodiments.

FIG. 4 is a diagram showing a side sectional view of an example modular stairwell and elevator shaft system in accordance with some embodiments. As shown in FIG. 4, first side panels 104 are shown installed and attached to structural members (e.g., so as to vertically span adjacent corbel beams 202-206). Also, as shown in FIG. 4, the height of the first and second elevator shaft panels 110 and 106 is greater than the height of the first side panels 104. For example, the first and second elevator shaft panels 110 and 106 may have a height of approximately two stories, while the first side panels 104 may have a height of about half of the height of the first and second elevator shaft panels 110 and 106 or about one story.

The end panels 102 are shown installed and attached so as to span vertically between adjacent structural members (e.g., corbel beams 402, 404, and 406).

Figure 5:
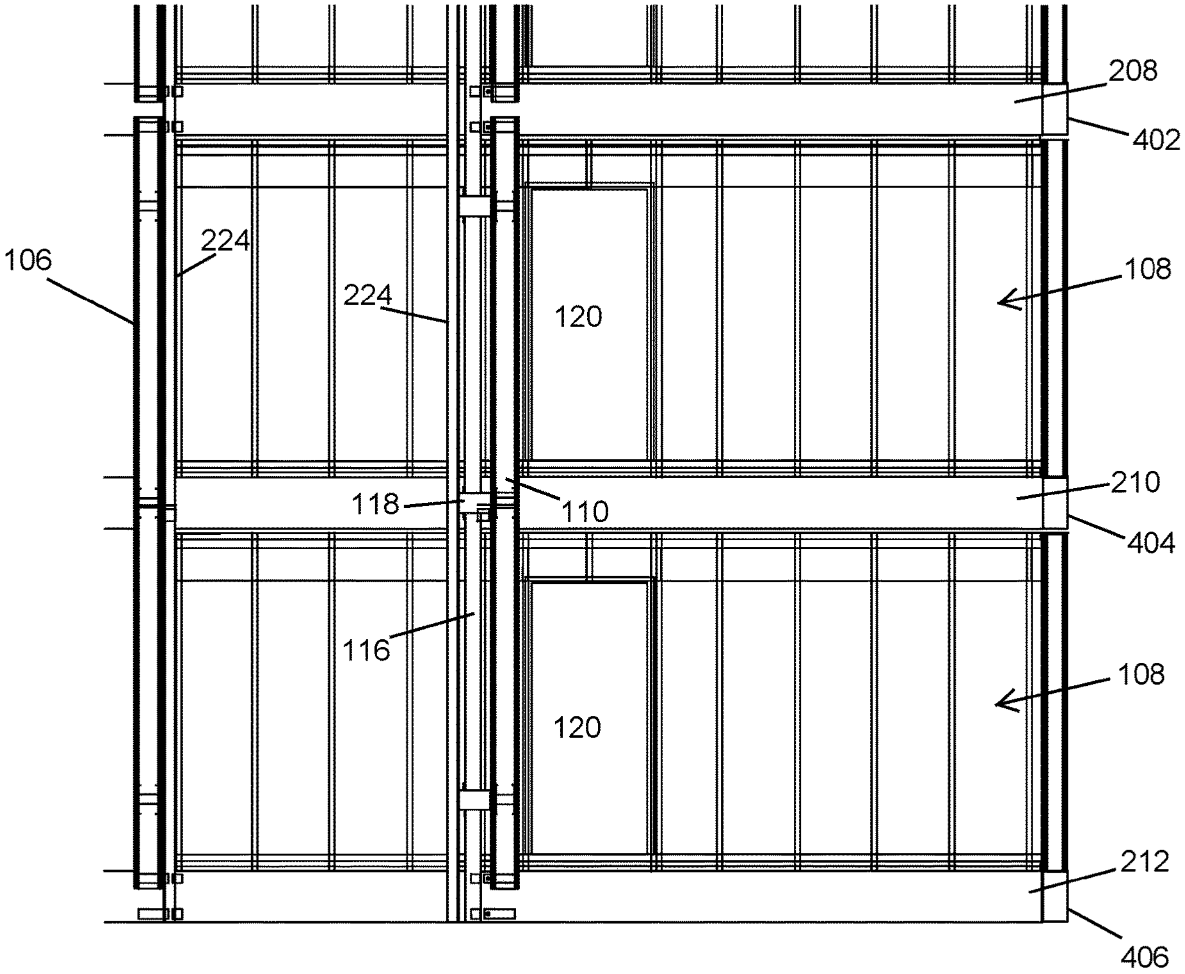
FIG. 5 is a diagram showing a side sectional view of an example modular stairwell and elevator shaft system in accordance with some embodiments.

FIG. 5 is a diagram showing a side sectional view of an example modular stairwell and elevator shaft system in accordance with some embodiments. As shown in FIG. 5, second side panels 108 are shown installed in a building and attached to structural members (e.g., so as to span adjacent corbel beams 208, 210, and 212). Also, as shown in FIG. 5, the height of the first and second elevator shaft panels 110 and 106 is greater than the height of the second side panels 108. For example, the first and second elevator shaft panels 110 and 106 may have a height of approximately two stories, while the second side panels 108 may have a height of about half of the height of the first and second elevator shaft panels 110 and 106 or about one story.

Figure 6:
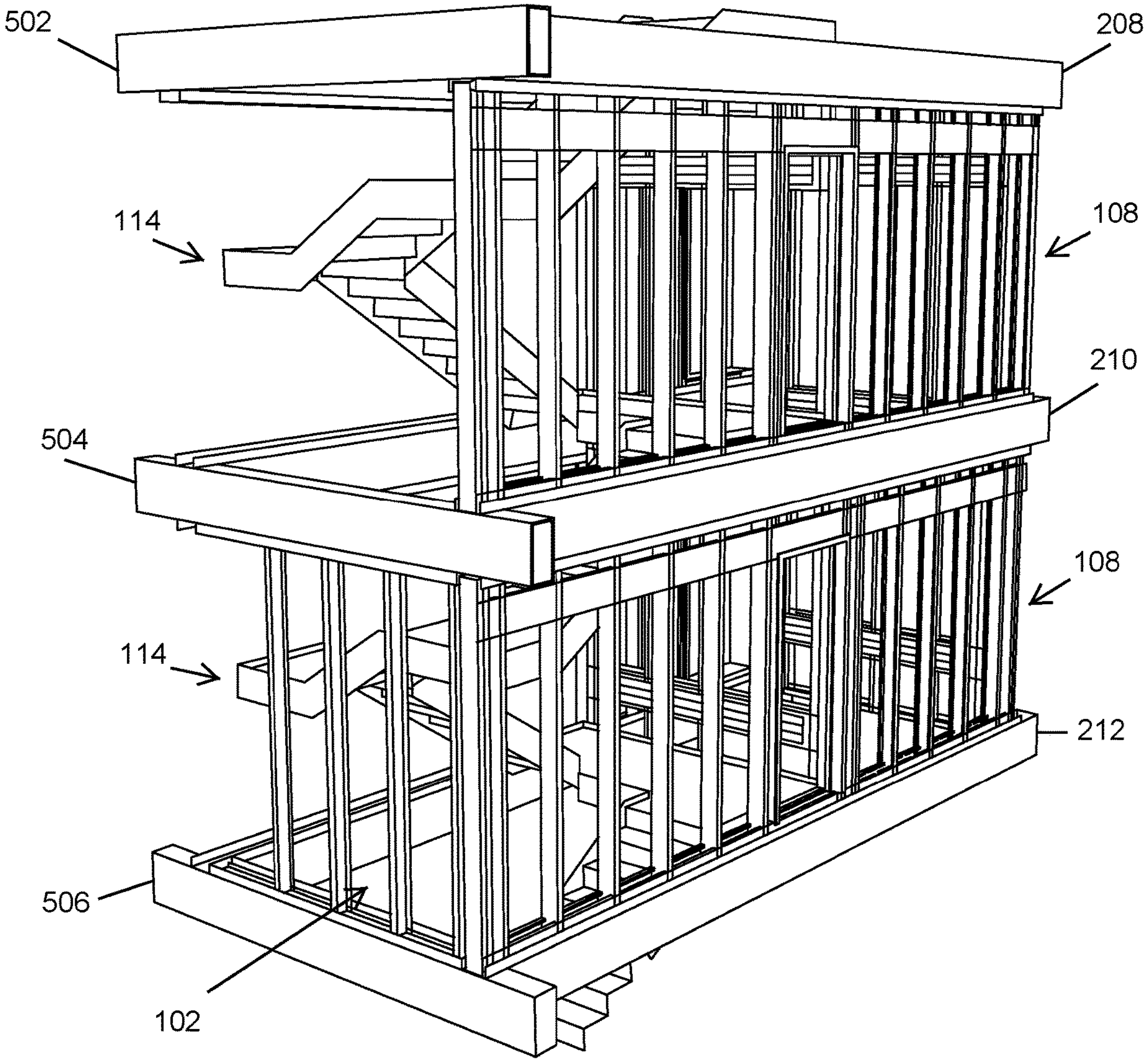
FIG. 6 is an angled perspective view of an example modular stairwell and elevator system in accordance with some embodiments.

FIG. 6 is an angled perspective view of an example modular stairwell and elevator system in accordance with some embodiments. As shown in FIG. 6, the arrangement of the second side panels 108 and stairwell components 114 is shown in relation to the structural members, e.g., corbel beams 502, 504, and 506 and 208, 210, and 212. An end panel 102 is also shown spanning adjacent corbel beams 502 and 504, and 504 and 506.

The second side panels 108 are attached at a top edge of the side panels 108 to an upper corbel beam (e.g., 208 or 210) and at a bottom edge of the side panels 108 to a lower corbel beam (e.g., 210 or 212). The end panel 102 is attached at a top edge of the end panel 102 to an upper corbel beam 504 and at a bottom edge of the end panel 102 to a lower corbel beam 506.

Figure 7:
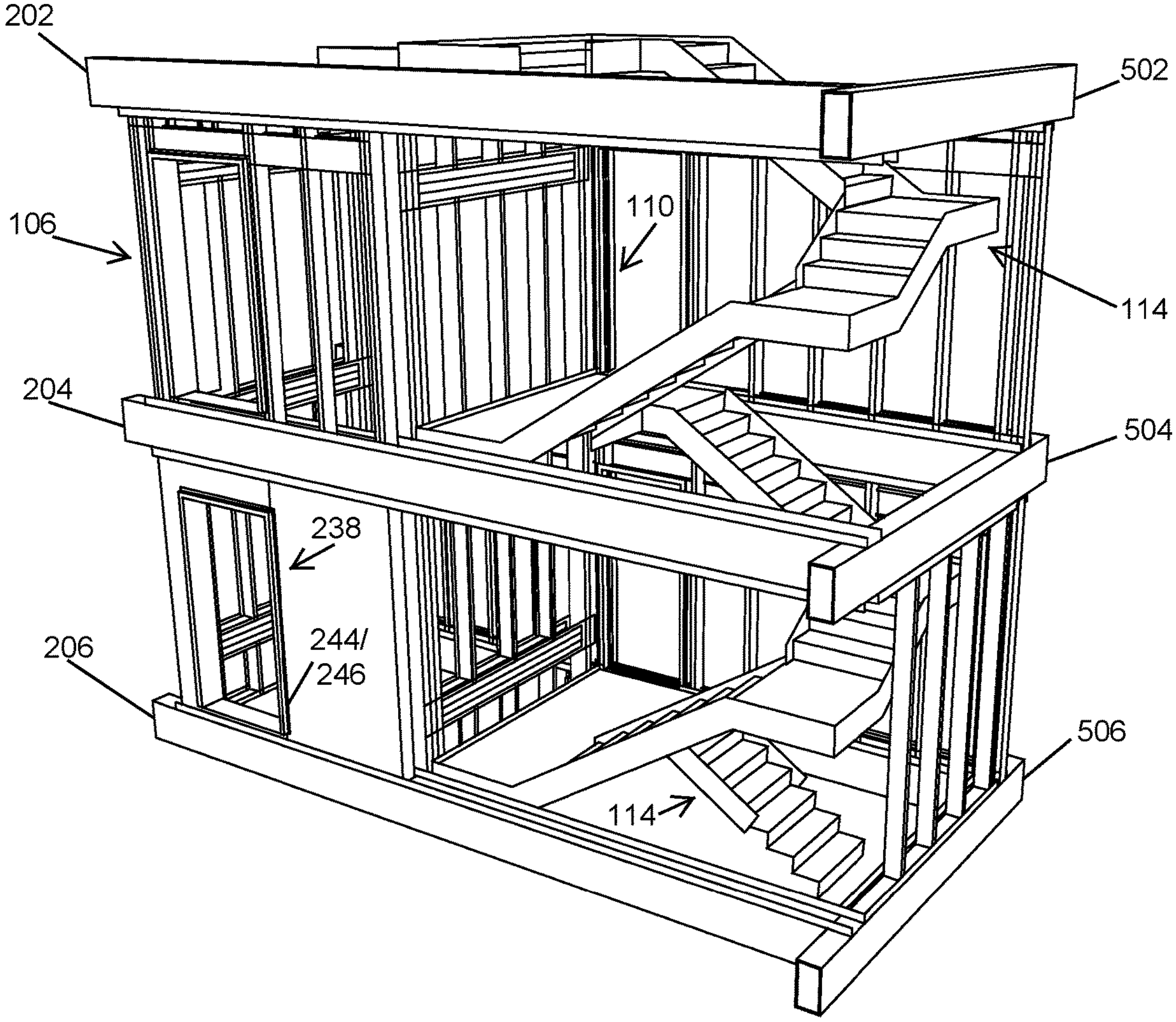
FIG. 7 is an angled perspective view of an example modular stairwell and elevator system in accordance with some embodiments.

FIG. 7 is an angled perspective view of an example modular stairwell and elevator system in accordance with some embodiments. FIG. 7 shows first and second elevator shaft panels 110 and 106 in relation to structural members such as corbel beams 202, 204, and 206 and 502, 504, and 506. Also shown is elevator door 238 and elevator door frame 244/246.

The first and second elevator shaft panels 110 and 106 are attached to three corbel beams (e.g., 202, 204, and 206) and vertically span two floors (or a distance greater that a vertical distance spanned by the side panels 108). The stairwell components 114 include treads and landings to form a staircase spanning between floors.

Figure 8:
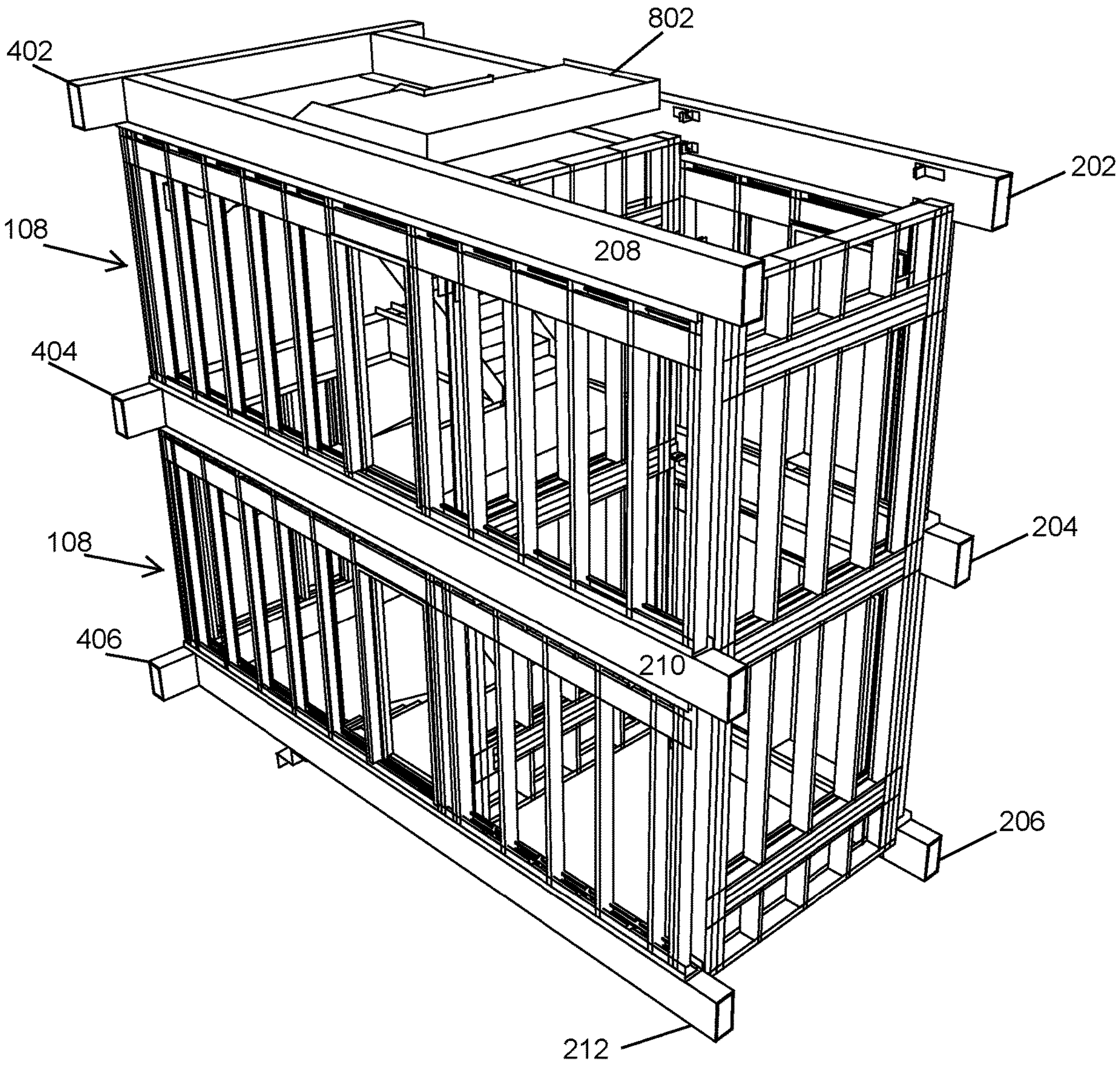
FIG. 8 is an angled perspective view of an example modular stairwell and elevator system in accordance with some embodiments.

FIG. 8 is an angled perspective view of an example modular stairwell and elevator system in accordance with some embodiments showing structural members 402-406 and 202-212 forming a structural framework within which the side panels 108 are installed. A stairwell landing 802 is also shown. A next floor of the building can be installed on top of the floor having the stairwell landing 802 such that as each subsequent floor is installed, the stairway is already completed and usable for the floor below and provides a safe path for workers to move between the completed floors.

Figure 9:
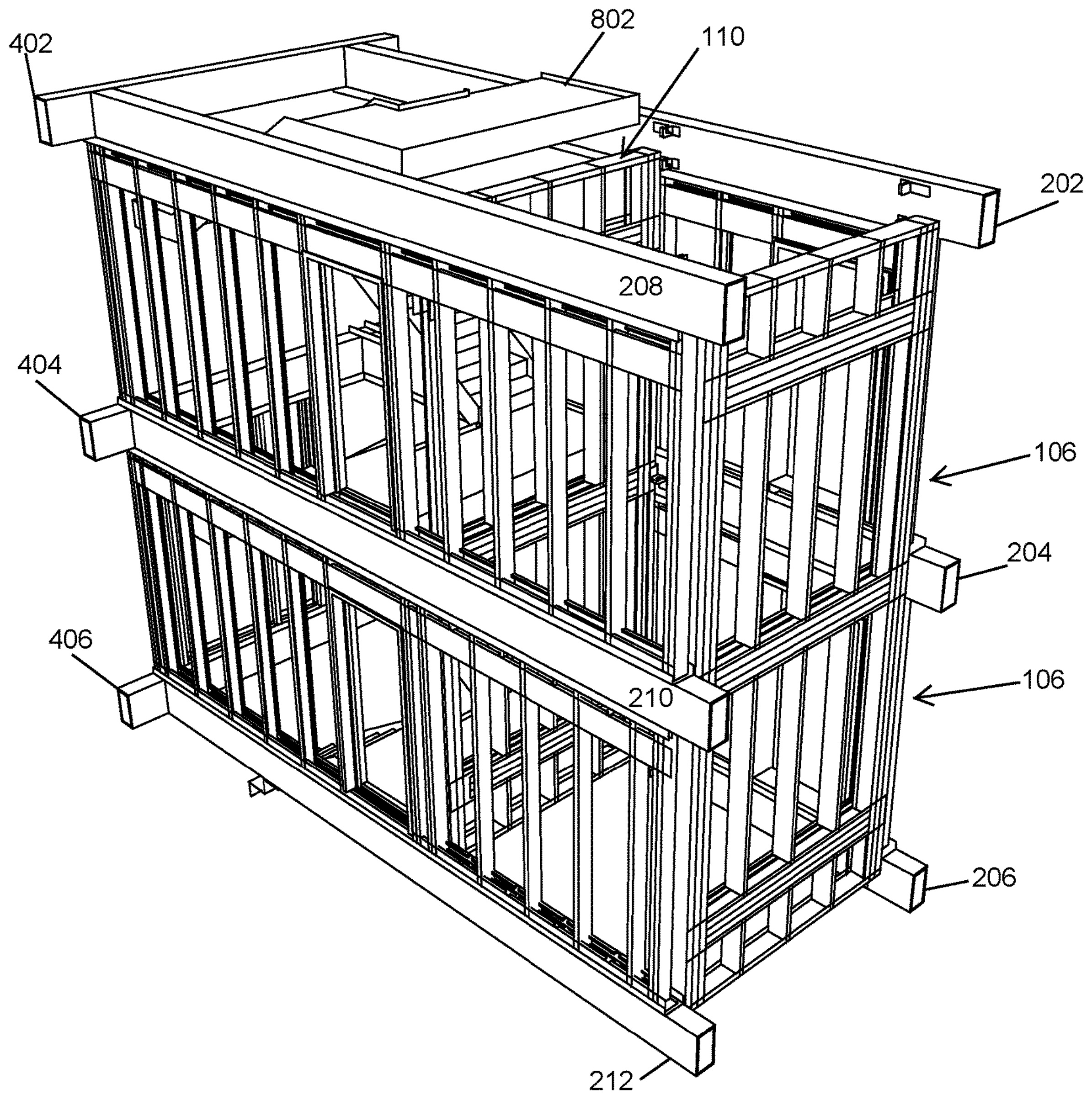
FIG. 9 is an angled perspective view of an example modular stairwell and elevator system in accordance with some embodiments.

FIG. 9 is an angled perspective view of an example modular stairwell and elevator system in accordance with some embodiments showing a structural framework provided by structural members 402-406 and 202-212 to which the second elevator shaft panel 106 (and first elevator shaft panel 110) can be connected to. For example, the second elevator shaft panel 106 is connected between corbel beams 202, 204, and 206, and the second elevator shaft panel vertically spans the two floors including corbel beams 202, 204, and 206.

Figure 10:
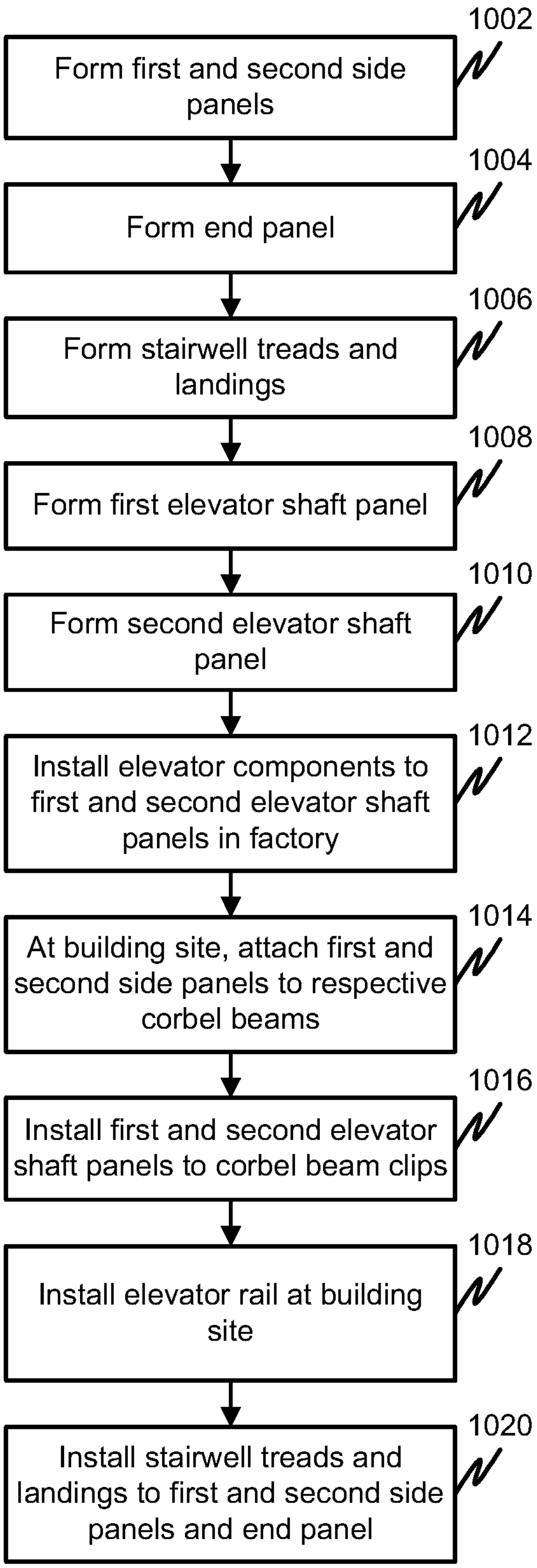
FIG. 10 is a flowchart of an example method to make and install a modular stairwell and elevator shaft system in accordance with some embodiments.

FIG. 10 is a flowchart of an example method to make and install a modular stairwell and elevator shaft in accordance with some embodiments. The method begins at 1002, where first and second side panels are formed. For example, first and second side panels 104 and 108 can be formed from light gauge framing and stairwell and handrail support components can be installed on the side panels. The side panels can be formed in a factory off-site from a building construction site and prior to installing the side panels in a building. The method continues to 1004.

At 1004, an end panel is formed. For example, end panel 102 is formed from light gauge framing and stairwell and handrail support components can be installed on the end panel. The side panels can be formed in a factory off-site from a building construction site and prior to installing the side panels in a building. The method continues to 1006.

At 1006, stairwell treads and landings are formed. Also, stairwell handrails can be formed at this stage. The stairwell treads, landings and handrails can be formed to be attached to stairwell and handrail support components installed on one or more of the first and second side panels or the end panel. The method continues to 1008.

At 1008, a first elevator shaft panel is formed. For example, the first elevator shaft panel 110 can be formed in a factory and can include one or more groups of light gauge members (e.g., light gauge framing members the same or similar to the framing members used in the side panels) installed together (e.g., multiple single light gauge framing members arranged adjacent to one another). The method continues to 1010.

At 1010, a second elevator shaft panel is formed. For example the second elevator shaft panel 106 can be formed in a factory and can include one or more groups of light gauge members (e.g., light gauge framing members the same or similar to the framing members used in the side panels) installed together (e.g., multiple single light gauge framing members arranged adjacent to one another). The method continues to 1012.

At 1012, elevator components are installed on the first and second elevator shaft panels (110/106). For example, first elevator components (e.g., counterweight rails 116, counterweight brackets 118, and elevator rail brackets 218-222) can be attached to the first elevator shaft panel 110 at the factory (e.g., prior to the elevator shaft panels being installed at a construction site). For example, the elevator components can be attached to the first and/or second elevator shaft panels at or near vertical framing members and horizontal framing members formed by groups of light gauge members. The method continues to 1014.

At 1014, at a building construction site, first and second side panels are installed and connected to structural members of a building. For example, the first and second side panels 104, 108 can be installed so as to vertically span pairs of adjacent corbel beams. The method continues to 1016.

At 1016, at the building site, the first and second elevator shaft panels are installed and attached to structural members of the building. For example, the first and second elevator shaft panels 110 and 106 can be installed and attached to adjacent corbel beams via corbel beam clips. The method continues to 1018.

At 1018, the elevator rail is installed on the first and second elevator shaft panels at the building construction site. The method continues to 1020.

At 1020, the stairwell components including stairwell treads, stairwell landings and stairwell handrails are installed and attached to the stairwell and handrail support components on one or more of the side panels or end panel. The stairwell can be assembled as the building is being built so that as the level of the building rises to a next upper floor, the stairwell can be built and ready to use to access the next upper floor from the floor(s) below. Steps 1002-1020 can be performed in a different order than described above and some steps may be omitted or repeated.

Some implementations can include use of relatively light gauge framing for both the side panels and the elevator shaft panels. Due to seismic load requirements and/or elevator load encountered by elevator shafts, elevator shafts are typically constructed on-site from heavier gauge framing. The disclosed system and method provides for use of lighter gauge framing for the elevator shaft panels, which can be manufactured off-site (e.g., off-site from a building construction site). Further, one or more elevator components can be installed or attached to the elevator panels prior to the elevator panels being delivered to and installed in a building at a building construction site.

Figure 11:
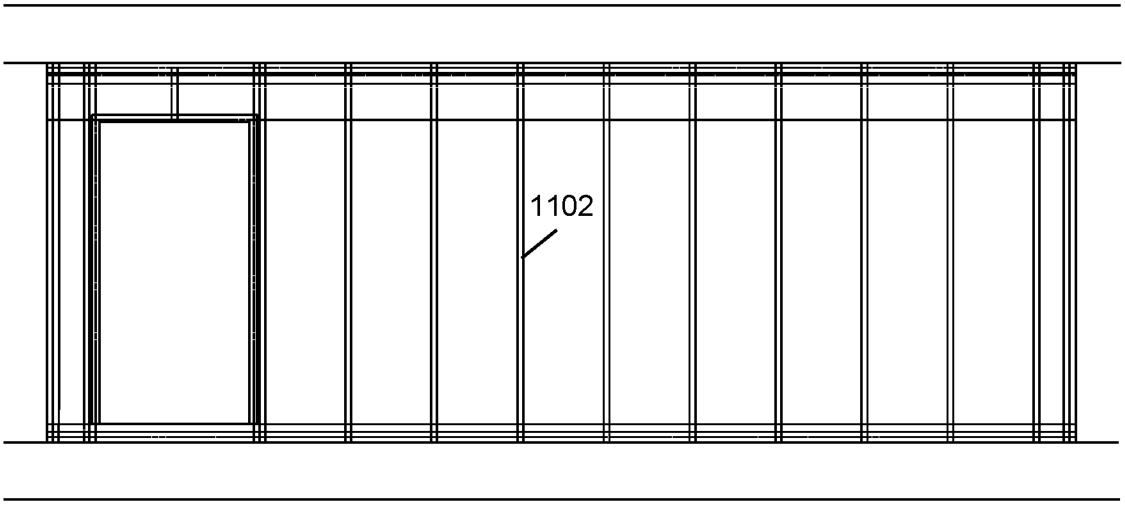
FIG. 11 is a diagram of an example side panel in accordance with some implementations.

FIG. 11 is a diagram of an example side panel (e.g., 104 and 108) in accordance with some implementations. In FIG. 11, the side panel is shown constructed from light gauge framing 1102 members. The light gauge framing members for the side panels can include single framing members (e.g., 1102) spaced apart according to a contemplated design.

Figure 12:
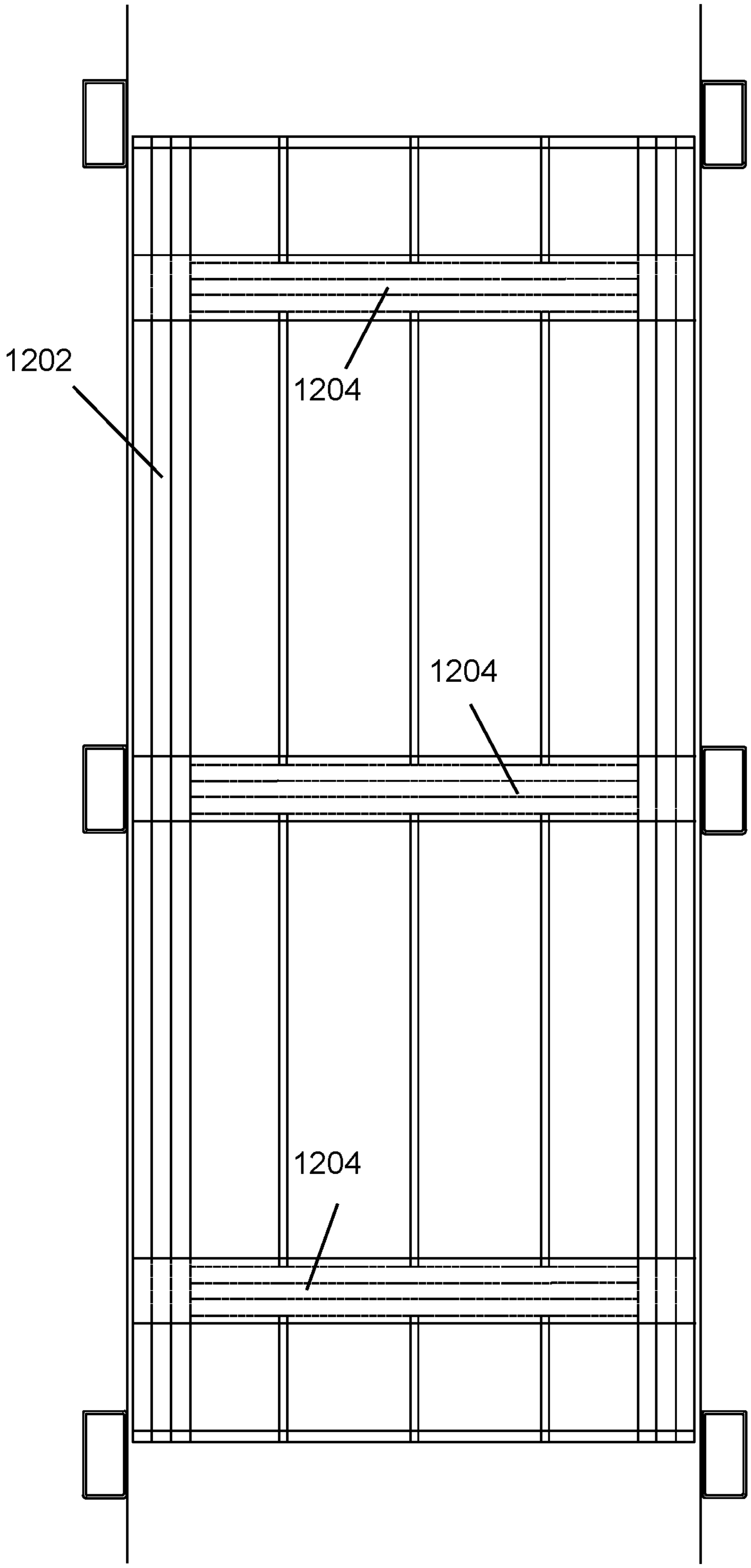
FIG. 12 is a diagram of an example elevator shaft panel in accordance with some implementations.

FIG. 12 is a diagram of an example elevator shaft panel (e.g., 106 and 110) in accordance with some implementations. The elevator shaft panel includes one or more groups of light gauge members (e.g., the same or similar to framing members 1102 used in the side panels) installed together (e.g., multiple single light gauge framing members arranged adjacent to one another) to form one or more vertical framing members 1202 and one or more horizontal framing members 1204 to withstand loads exerted by the elevator and/or seismic loads. Elevator components (e.g., elevator rail brackets, elevator rails, counterweight brackets, counterweight rails, etc.) are attached or otherwise coupled to the elevator shaft panels (e.g., 106, 110) at or near the vertical framing members 1202 and horizontal framing members 1204. Thus, an elevator shaft and stairwell can be formed using elevator shaft panels and side panels formed from single and/or grouped light gauge members.

Figure 13:
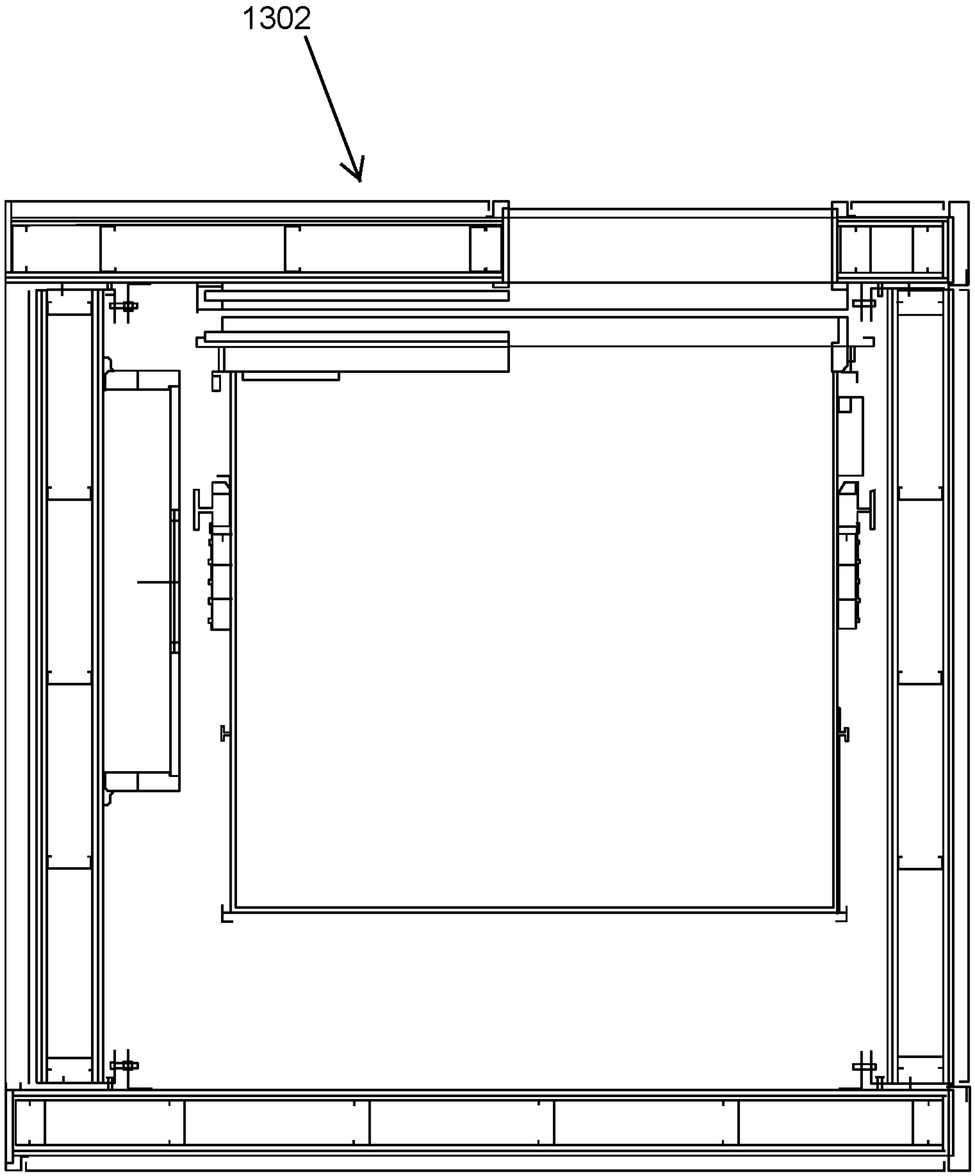
FIG. 13 is a diagram of an example elevator only configuration in accordance with some implementations.
Figure 14:
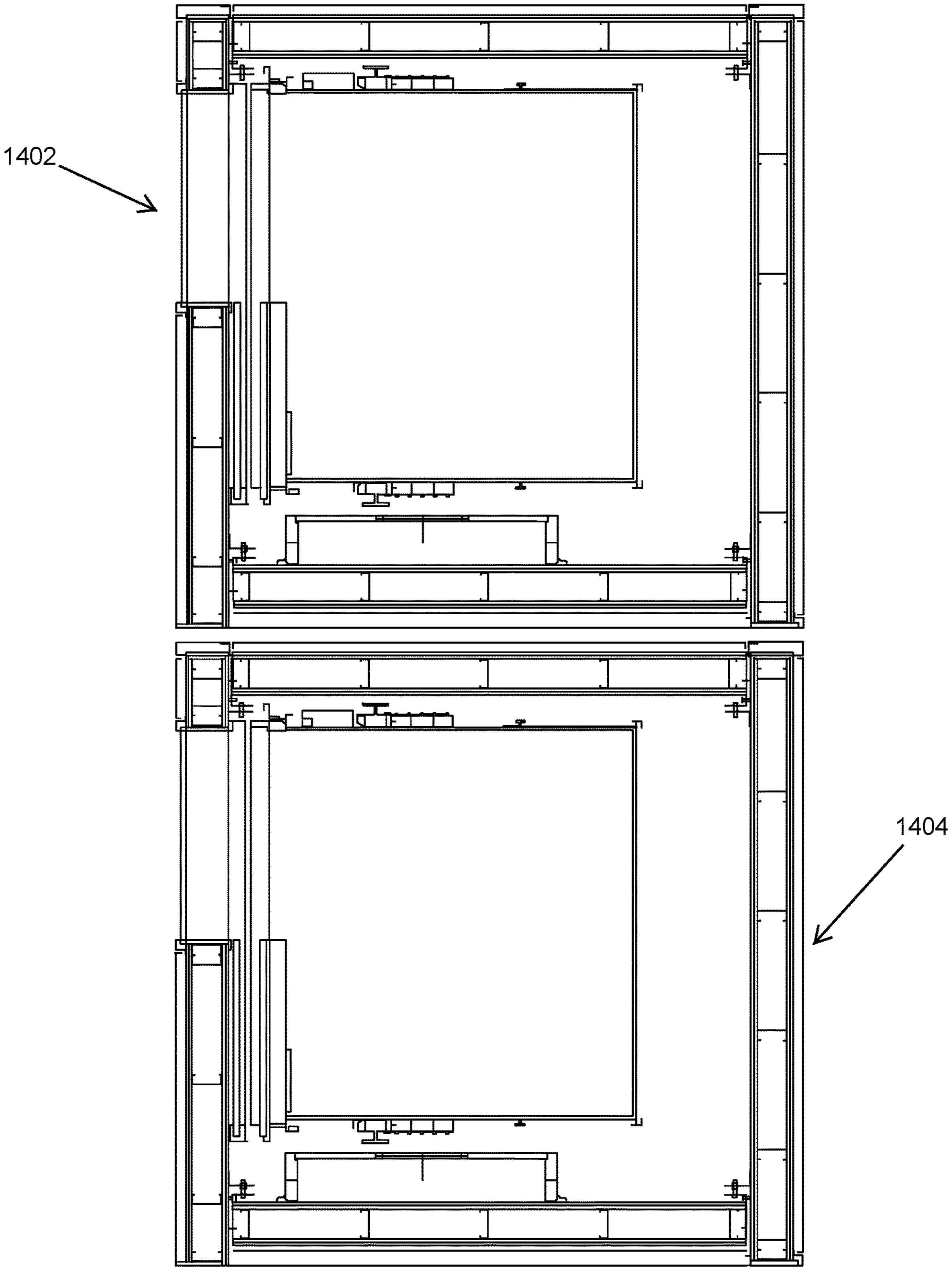
FIG. 14 is a diagram of an example elevator only configuration in accordance with some implementations.

Some implementations can include one or more elevators only, one or more stairwells only, or a combination of one or more elevators and stairwells. For example, FIG. 13 shows an example single elevator only configuration (1302) in accordance with some implementations. FIG. 14 shows an example multiple elevator only configuration (1402 and 1404) in accordance with some implementations, where two are shown but more could be included in an implementation.

Figure 15:
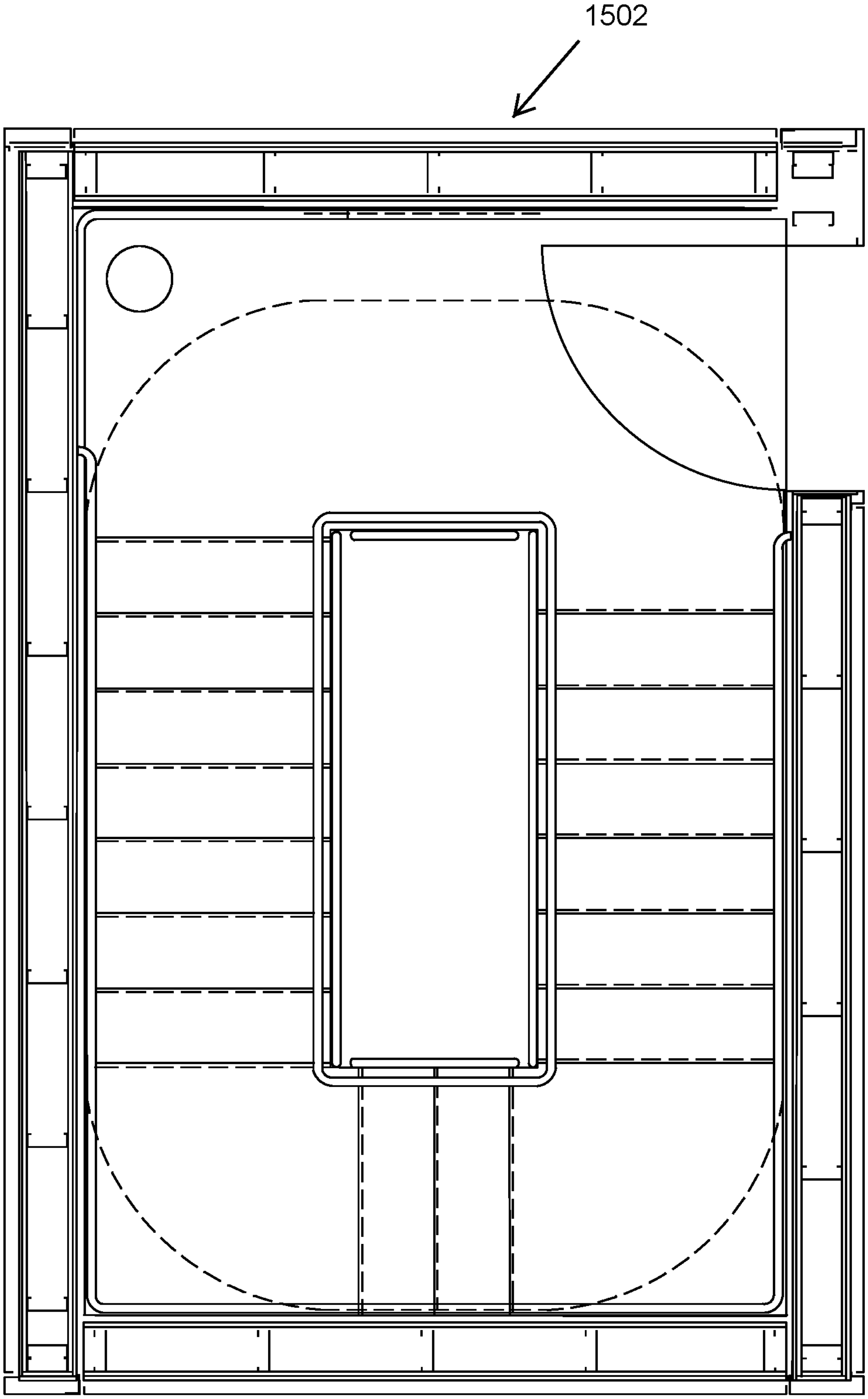
FIG. 15 is a diagram of an example stairwell only configuration in accordance with some implementations.
Figure 16:
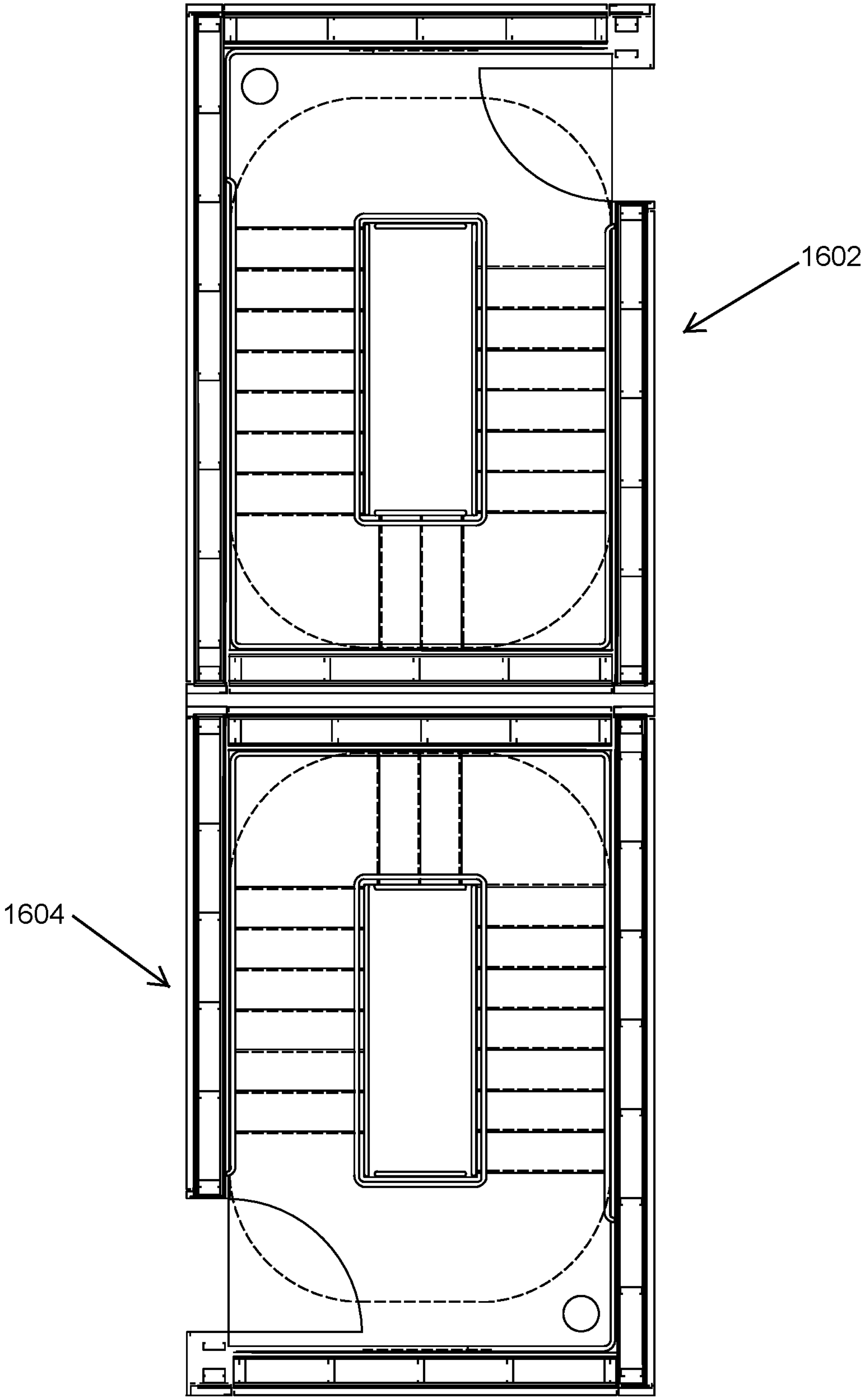
FIG. 16 is a diagram of an example stairwell only configuration in accordance with some implementations.

FIG. 15 shows an example single stairwell only configuration (1502) in accordance with some implementations. FIG. 16 shows an example multiple stairwell only configuration (1602 and 1604) in accordance with some implementations, where two are shown but more could be included in an implementation.

Figure 17:
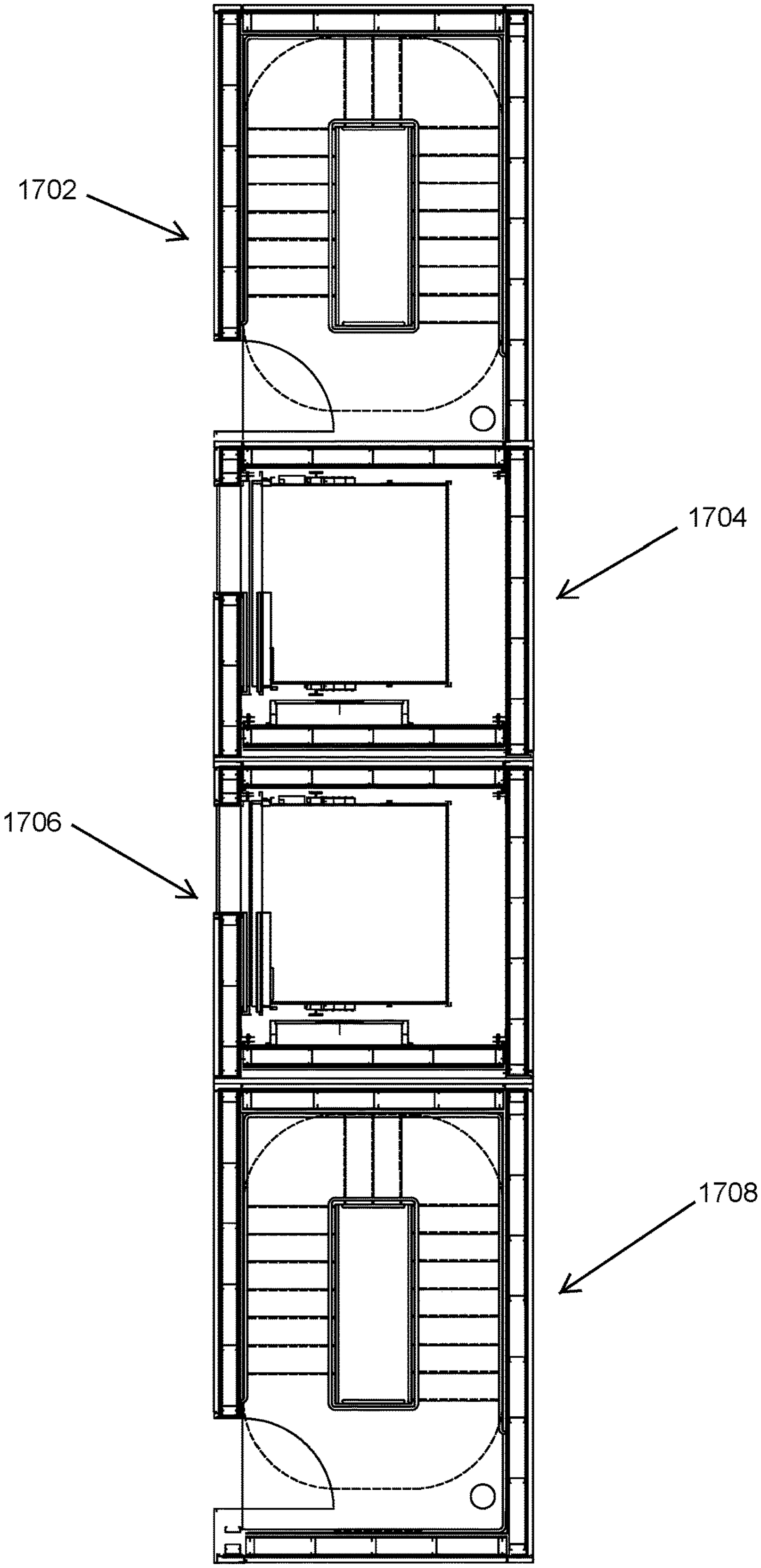
FIG. 17 is a diagram of an example stairwell and elevator configuration in accordance with some implementations.

FIG. 17 shows an example multiple stairwell (1702 and 1708) and multiple elevator (1704 and 1706) configuration in accordance with some implementations, where two of each are shown but more elevators, stairwells, or both could be included in an implementation.

The modular stairwell and elevator shaft sections may be attached to the frame of a building, for example to an internal or external structural frame, via one or more plates bolted to structural members such as a corbel beam. For example, the floor and ceiling panel may be attached to an exterior steel structure, which may provide the structural support for a building. Generally, any mechanism may be used to attach the modular stairwell and elevator shaft sections to the frame of the building, such as the corbel beams. Any type of fastening may generally be used. In some embodiments, the modular stairwell and elevator shaft sections may be coupled to a vertical or horizontal corbel beam included in the frame of the building.

The modular stairwell and elevator shaft sections described herein may be fabricated off-site in a factory or shop and transported to the project jobsite for attachment to a structural frame, of a building. At the building site, the modular stairwell and elevator shaft sections may be attached to structural frame members, floor and ceiling panels, end walls, demising walls, utility panels, building utilities, or any combination thereof. The structural frame members may provide support for the modular stairwell and elevator shaft sections. In some embodiments, the modular stairwell and elevator shaft sections transfer loads to the structural frame members. In some embodiments, the modular stairwell and elevator shaft sections transfer loads directly to a steel structure of the building, and the modular stairwell and elevator shaft sections do not translate loads from the floor and ceiling panel to the structure.

The examples provided herein are for explanatory purposes only and should not be considered to limit the scope of the disclosure. Each example embodiment may be practical for a particular environment such as urban mixed-use developments, low-rise residential units, and/or remote communities. Materials and dimensions for individual elements may be configured to comply with one or more of the following building codes: fire, energy, handicap, life-safety, and acoustical (impact and ambient noise transfer) without departing from the scope of the principles of the disclosure. The elements and/or system may also be configured to comply with social and/or religious codes as desired. For example, materials, systems, methods, and/or apparatuses may be configured to comply with the International Building Code as it has been adopted in a jurisdiction.

The present disclosure is not to be limited in terms of the particular embodiments described in this application, which are intended as illustrations of various aspects. Many modifications and embodiments can be made without departing from its spirit and scope. Functionally equivalent methods and apparatuses within the scope of the disclosure, in addition to those enumerated herein, are possible from the foregoing descriptions. Such modifications and embodiments are intended to fall within the scope of the appended claims. The present disclosure is to be limited only by the terms of the appended claims, along with the full scope of equivalents to which such claims are entitled. This disclosure is not limited to particular methods, which can vary. The terminology used herein is for the purpose of describing particular embodiments only, and is not intended to be limiting.

With respect to the use of substantially any plural and/or singular terms herein, those terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

If a specific number of an introduced claim recitation is intended, such intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, contemplates the possibilities of including one of the terms, either of the terms, or both terms. For example, the phrase “A or B” includes the possibilities of “A” or “B” or “A and B.”

In addition, where features or aspects of the disclosure are described in terms of Markush groups, the disclosure is also thereby described in terms of any individual member or subgroup of members of the Markush group.

Ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be broken down into a lower third, middle third and upper third, etc. Language such as “up to,” “at least,” “greater than,” “less than,” and the like include the number recited and refer to ranges which can be subsequently broken down into subranges as discussed above. Finally, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. Depicted architectures are merely embodiments, and that in fact many other architectures can be implemented which achieve the same functionality. In a conceptual sense, any arrangement of components to achieve the same functionality is effectively “associated” such that the desired functionality is achieved. Hence, any two components herein combined to achieve a particular functionality can be seen as “associated with” each other such that the desired functionality is achieved, irrespective of architectures or intermedial components. Likewise, any two components so associated can also be viewed as being “operably connected”, or “operably coupled”, to each other to achieve the desired functionality, and any two components capable of being so associated can also be viewed as being “operably couplable”, to each other to achieve the desired functionality. Specific embodiments of operably couplable include but are not limited to physically mateable and/or physically interacting components.

While various aspects and embodiments have been disclosed herein, other aspects and embodiments are possible. The various aspects and embodiments disclosed herein are for purposes of illustration and are not intended to be limiting.

What is claimed is:

1. A modular stairwell and elevator shaft system, comprising:

a first side panel having an elevator door and an elevator door frame, wherein the first side panel is operable to span vertically between a first pair of adjacent corbel beams, and wherein the first side panel includes stairwell and handrail support components;

a second side panel, parallel to the first side panel, and having a stairwell door and a stairwell door frame, wherein the second side panel is operable to span vertically between a second pair of adjacent corbel beams, and wherein the second side panel includes stairwell and handrail support components;

an end panel, orthogonal to the first and second side panels, and operable to span vertically between a third pair of adjacent corbel beams;

a first elevator shaft panel, parallel to the end panel, and including first elevator components;

a second elevator shaft panel, parallel to the first elevator shaft panel, and including second elevator components;

one or more stairwell treads configured to attach to the stairwell and handrail support components of at least one of the first side panel and the second side panel;

one or more stairwell handrails configured to attach to the stairwell and handrail support components of at least one of the first side panel and the second side panel; and one or more stairwell landings configured to attach to the stairwell and handrail support components of at least one of the first side panel and the second side panel.

2. The modular stairwell and elevator shaft system of claim 1, wherein the first side panel, the second side panel, and the end panel are a first height, and wherein the first elevator shaft panel and the second elevator shaft panel are each a second height that is greater than the first height.

3. The modular stairwell and elevator shaft system of claim 2, wherein the first height spans a portion of one story and the second height spans a portion of two stories.

4. The modular stairwell and elevator shaft system of claim 1, wherein the stairwell and handrail support components are installed on the first side panel, the second side panel, and the end panel in a factory off-site from a building construction site.

5. The modular stairwell and elevator shaft system of claim 1, wherein the first elevator shaft panel and the second elevator shaft panel are operable to attach to respective corbel beam clips attached to corresponding corbel beams, and wherein the first elevator shaft panel and the second elevator shaft panel each include multiple light gauge members installed together to form one or more vertical framing members and one or more horizontal framing members.

6. The modular stairwell and elevator shaft system of claim 1, wherein the elevator door frame and the elevator door are installed in the first side panel in a factory off-site from a building construction site.

7. The modular stairwell and elevator shaft system of claim 1, wherein the stairwell door frame and the stairwell door are installed in the second side panel in a factory off-site from a building construction site.

8. The modular stairwell and elevator shaft system of claim 1, wherein the one or more stairwell treads, the one or more stairwell handrails, and the one or more stairwell landings are installed at a building construction site.

9. The modular stairwell and elevator shaft system of claim 1, wherein the first elevator components include one or more counterweight rails, one or more counterweight brackets, and one or more elevator rail brackets.

10. The modular stairwell and elevator shaft system of claim 1, wherein the second elevator components include one or more elevator rail brackets.

11. The modular stairwell and elevator shaft system of claim 1, further comprising:

one or more elevator rails, wherein the one or more elevator rails are installed, at a building construction site, on respective elevator rail brackets that were installed on the first elevator shaft panel and the second elevator shaft panel in a factory off-site from the building construction site.

12. A method to install a modular stairwell and elevator shaft system, the method comprising:

installing, in a building, a first side panel to span vertically between a first pair of adjacent corbel beams, wherein the first side panel includes an elevator door, an elevator door frame, and stairwell and handrail support components;

installing, in the building, a second side panel, parallel to the first side panel, and configured to span vertically between a second pair of adjacent corbel beams, wherein the second side panel includes a stairwell door frame, a stairwell door, and stairwell and handrail support components;

installing, in the building, an end panel, orthogonal to the first and second side panels, and configured to span vertically between a third pair of adjacent corbel beams;

installing, in the building, a first elevator shaft panel, parallel to the end panel, and having first elevator components that were attached to the first elevator shaft panel prior to the first elevator shaft panel being installed in the building, wherein the first elevator shaft panel is attached to one or more corbel beams via corresponding corbel beam clips;

installing, in the building, a second elevator shaft panel, parallel to the first elevator shaft panel, and having second elevator components that were attached to the second elevator shaft panel prior to the second elevator shaft panel being installed in the building, wherein the second elevator shaft panel is attached to one or more corbel beams via corresponding corbel beam clips;

attaching one or more stairwell treads to the stairwell and handrail support components of at least one of the first side panel and the second side panel;

attaching one or more stairwell handrails to the stairwell and handrail support components of at least one of the first side panel and the second side panel; and attaching one or more stairwell landings to the stairwell and handrail support components of at least one of the first side panel and the second side panel.

13. The method of claim 12, further comprising:

installing, in the building, one or more elevator rails on respective elevator rail brackets on the first elevator shaft panel and the second elevator shaft panel.

14. The method of claim 12, wherein the first elevator components include one or more counterweight rails, one or more counterweight brackets, and one or more elevator rail brackets, and wherein the second elevator components include one or more elevator rail brackets.

* * * * *